United States Patent
Lee et al.

(10) Patent No.: US 11,800,946 B2
(45) Date of Patent: *Oct. 31, 2023

(54) COOKING APPARATUS

(71) Applicant: LG ELECTRONICS INC., Seoul (KR)

(72) Inventors: Jeonghyun Lee, Seoul (KR); Sungho Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 165 days.

This patent is subject to a terminal disclaimer.

(21) Appl. No.: 17/340,033

(22) Filed: Jun. 6, 2021

(65) Prior Publication Data
US 2021/0289972 A1    Sep. 23, 2021

Related U.S. Application Data

(63) Continuation of application No. 16/159,784, filed on Oct. 15, 2018, now Pat. No. 11,051,647.

(Continued)

(51) Int. Cl.
*A47J 27/00* (2006.01)
*A47J 27/10* (2006.01)
(Continued)

(52) U.S. Cl.
CPC ........... *A47J 27/002* (2013.01); *A47J 27/004* (2013.01); *A47J 27/10* (2013.01); *A47J 36/32* (2013.01); *H05B 3/06* (2013.01); *A47J 2027/006* (2013.01)

(58) Field of Classification Search
None
See application file for complete search history.

(56) References Cited

U.S. PATENT DOCUMENTS 2,595,527 A * 5/1952 Kells ................. A47J 27/17
392/394
3,508,485 A * 4/1970 Munsey ............. H05B 1/0213
219/442
(Continued)

FOREIGN PATENT DOCUMENTS

CN    108324087 A  *  7/2018  ............ A47J 27/002
DE    29511075         9/1995
(Continued)

OTHER PUBLICATIONS

European Search Report dated Jul. 10, 2019 issued in EP Application No. 19150948.8.

(Continued)

*Primary Examiner* — Joseph M. Pelham
(74) *Attorney, Agent, or Firm* — KED & ASSOCIATES, LLP

(57) ABSTRACT

A cooking apparatus may include a housing having an open top surface and having a cooking space formed therein; a door provided on a top of the housing to open and close the cooking space; a container inserted into the housing, the container having an open top surface to receive food to be cooked therein; and a heating unit provided in the housing and contacting a bottom surface of the container to heat the container. The heating unit may include a heating unit body defining a support surface that supports the container; a heater provided in the heating unit body; and a rib that extends downward from the heating unit body to prevent water or foreign material from entering between the heating unit and a bottom of the housing.

20 Claims, 26 Drawing Sheets

Related U.S. Application Data

(60) Provisional application No. 62/571,904, filed on Oct. 13, 2017.

(51) Int. Cl.
*A47J 36/32* (2006.01)
*A47J 27/18* (2006.01)
*H05B 3/06* (2006.01)

(56) References Cited

U.S. PATENT DOCUMENTS

| | | | | |
|---|---|---|---|---|
| 3,875,370 | A * | 4/1975 | Williams | A47J 36/2483 |
| | | | | 219/439 |
| 4,052,590 | A * | 10/1977 | Anderl | H05B 3/68 |
| | | | | 219/535 |
| 4,215,267 | A * | 7/1980 | Kaebitzsch | A47J 27/004 |
| | | | | 219/453.11 |
| 5,445,062 | A * | 8/1995 | Polster | A47J 27/10 |
| | | | | 99/348 |
| 5,611,265 | A | 3/1997 | Ronci et al. | |
| 6,173,643 | B1 * | 1/2001 | Qian | A47J 27/086 |
| | | | | 99/413 |
| 11,051,647 | B2 * | 7/2021 | Lee | A47J 27/004 |
| 2001/0002891 | A1 * | 6/2001 | Frankel | A47J 43/0722 |
| | | | | 426/570 |
| 2007/0193575 | A1 * | 8/2007 | Jan | A47J 27/002 |
| | | | | 126/390.1 |
| 2009/0212038 | A1 | 8/2009 | Ahlander | |
| 2010/0282457 | A1 * | 11/2010 | Li | A47J 27/022 |
| | | | | 165/185 |
| 2014/0044849 | A1 | 2/2014 | Khan | |
| 2016/0309940 | A1 * | 10/2016 | Valance | A23L 5/13 |
| 2017/0143152 | A1 * | 5/2017 | Blond | A47J 27/58 |
| 2017/0188743 | A1 * | 7/2017 | Snyder | H05B 6/1209 |
| 2020/0245804 | A1 * | 8/2020 | Lee | A47J 27/10 |
| 2020/0253410 | A1 * | 8/2020 | Smith | H05B 3/265 |

FOREIGN PATENT DOCUMENTS

| | | |
|---|---|---|
| JP | H05-200046 | 8/1993 |
| JP | H07-31541 | 2/1995 |
| JP | H11-032911 | 2/1999 |
| KR | 10-2018-0088781 | 8/2018 |
| WO | WO 2007/046762 | 4/2007 |

OTHER PUBLICATIONS

Korean Office Action dated Sep. 30, 2019 issued in KR Application No. 10-2018-0162321.
Korean Office Action dated Apr. 30, 2020 issued in KR Application No. 10-2018-0162321.
United States Office Action dated Sep. 17, 2020 issued in co-pending related U.S. Appl. No. 16/159,784.

* cited by examiner

COOKING APPARATUS

CROSS-REFERENCE TO RELATED APPLICATIONS

This application is a Continuation Application of prior U.S. patent application Ser. No. 16/159,784 filed Oct. 15, 2018, which is based on and claims the benefit of U.S. Provisional Patent Application No. 62/571,904, filed on Oct. 13, 2017, which is hereby incorporated by reference in its entirety.

BACKGROUND

1. Field

A cooking apparatus, and more particularly, a cooking apparatus capable of performing sous vide cooking are disclosed herein.

2. Background

Generally, a cooking apparatus may be home appliance for cooking food or other items (hereinafter "food"), which may be installed in a kitchen space and may cook food according to the user's intention. Such a cooking apparatus may be classified into various types according to a heat source or type used and a type of fuel.

When the cooking apparatus is classified according to the type of food being cooked, it may be classified into an open type or closed type cooking apparatus depending on the type of space in which the food is placed. The closed type cooking apparatus includes an oven and a microwave oven, for example, while the open type cooking apparatus includes a cook top and a hop, for example.

In recent years, a hybrid cooking apparatus has been developed in which the open type cooking apparatus is disposed above the closed type cooking apparatus. The cooking apparatus is being developed to combine devices having various cooking methods and structures.

In addition to commonly known recipes such as oven cooking, grilled cooking, steamed cooking using the open type cooking apparatus or closed type cooking apparatus, several new recipes are newly developed. Unique recipes that were only used in specific areas are increasingly being propagated to the general public. One of the latter cases is the sous vide recipe. A sous vide recipe is a recipe for keeping nutrients, texture, and taste at their best via low temperature vacuum recipe.

Sous vide cooking takes a long time to cook (typically 4 to 48 hours). As the cooking temperature and cooking time are difficult to control in sous vide cooking, a separate cooking apparatus is required for effective sous vide cooking.

BRIEF DESCRIPTION OF THE DRAWINGS

Embodiments will be described in detail with reference to the following drawings in which like reference numerals refer to like elements, and wherein.

DETAILED DESCRIPTION

Figure 1:
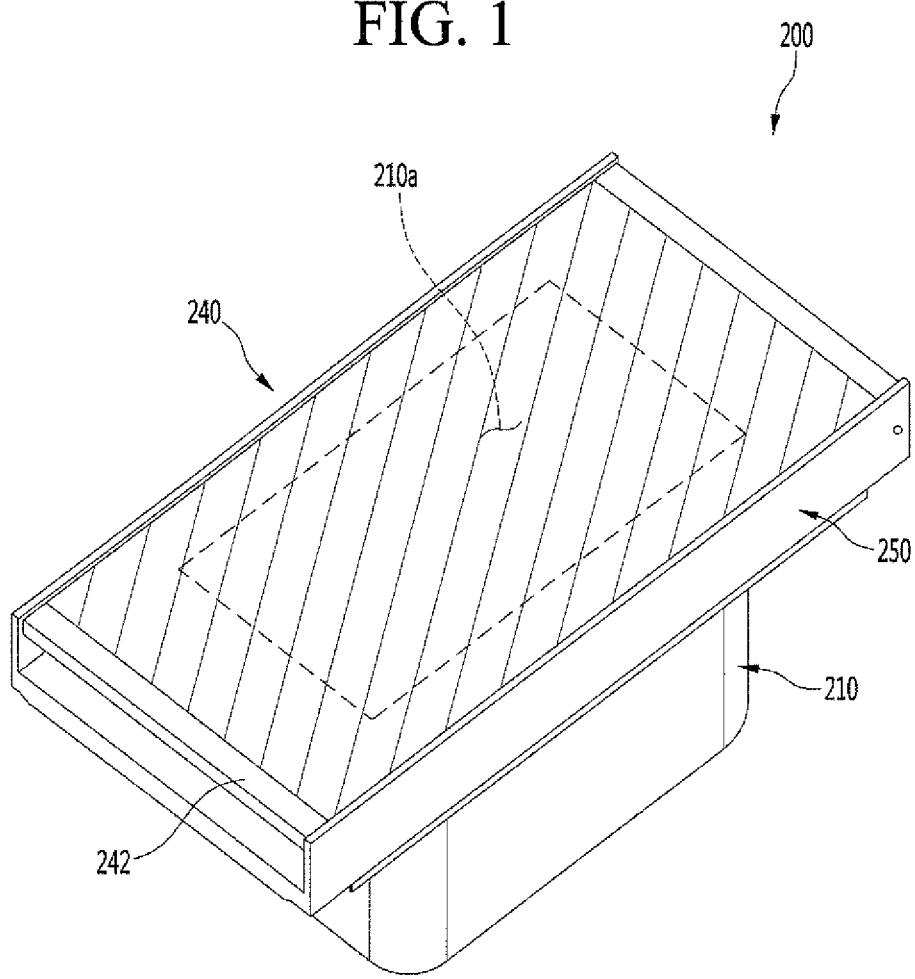
FIG. 1 is a perspective view of a cooking apparatus according to an embodiment, as viewed from above.

Hereinafter, embodiments will be described with reference to the drawings. Wherever possible, like reference numerals have been used to indicate like elements, and repetitive disclosure has been omitted.

Figure 2:
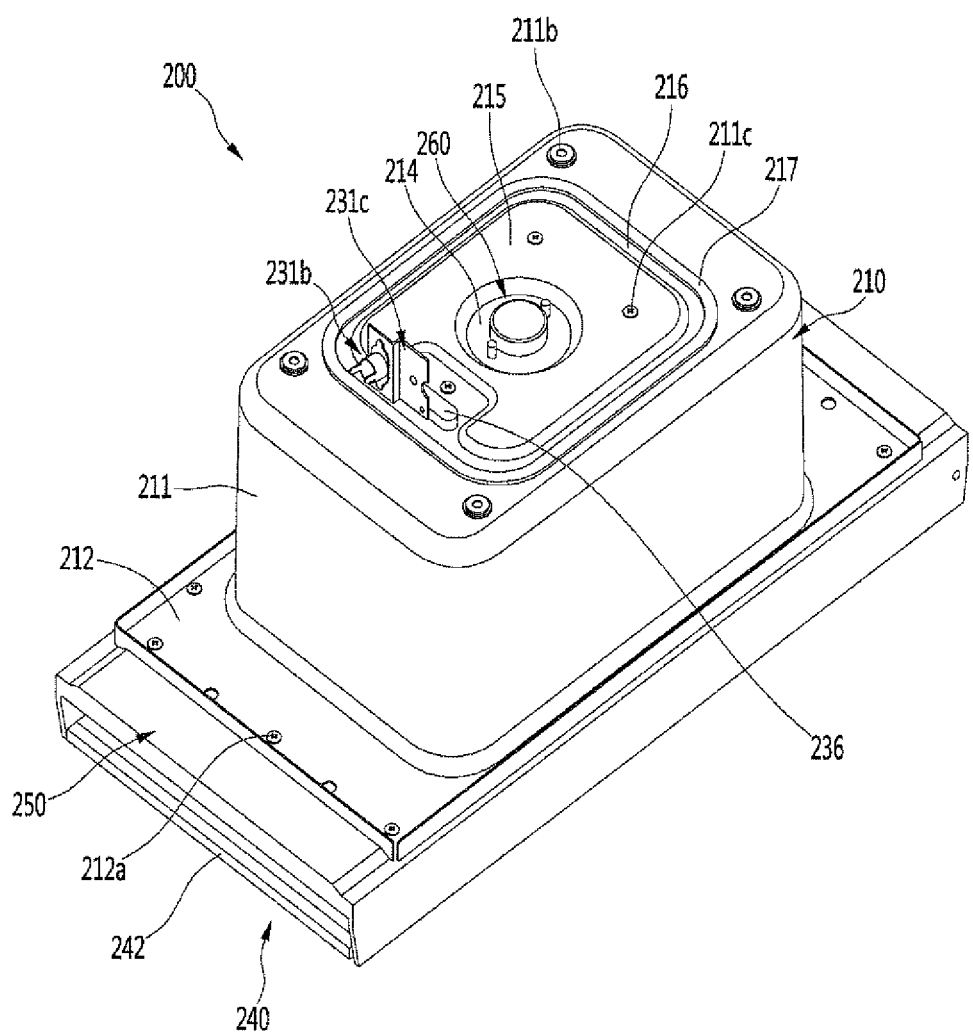
FIG. 2 is a perspective view of the cooking apparatus of FIG. 1, as viewed from below.
Figure 3:
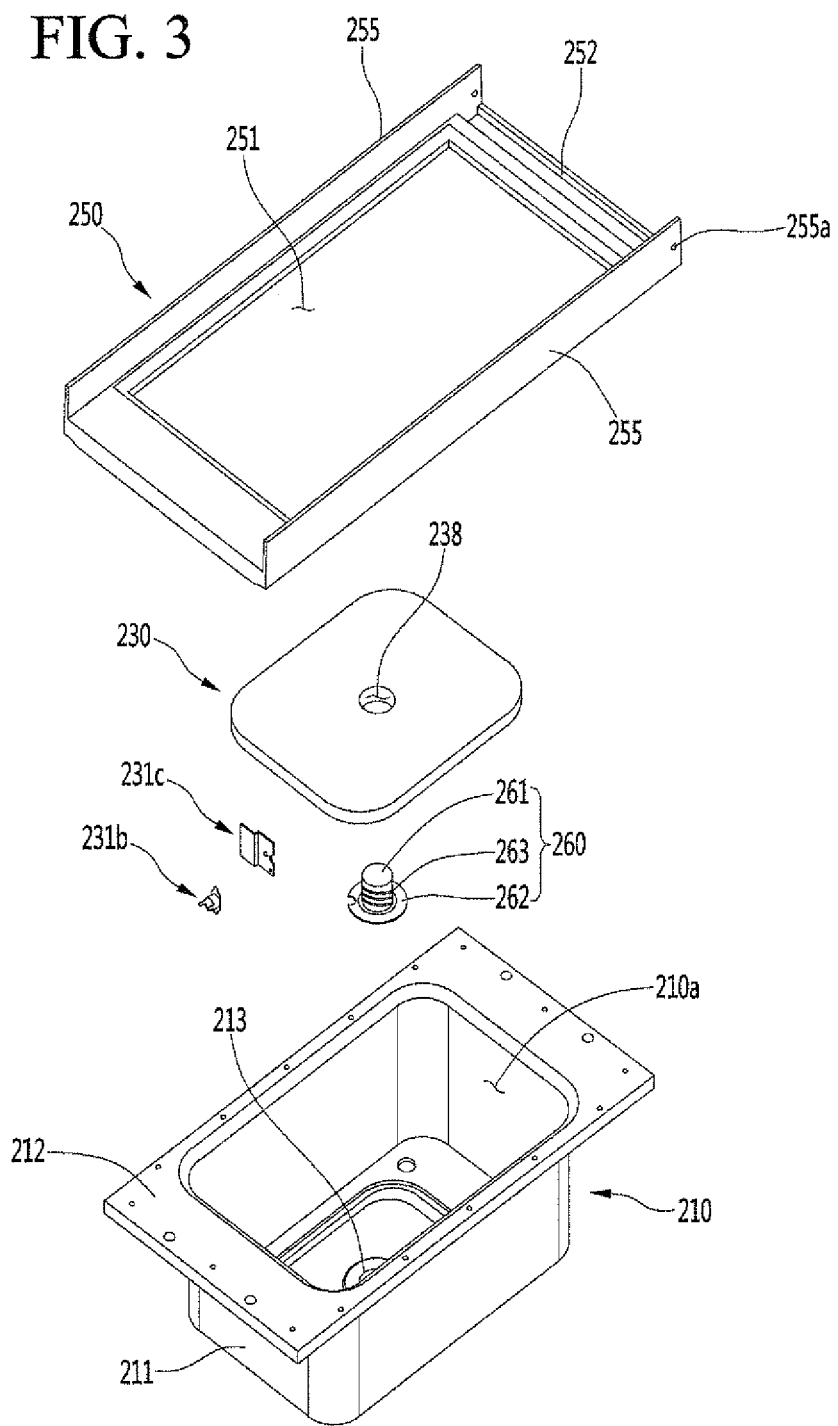
FIG. 3 is an exploded perspective view of a combined structure of a housing and a heating unit of the cooking apparatus of FIG. 1, as viewed from above.
Figure 4:
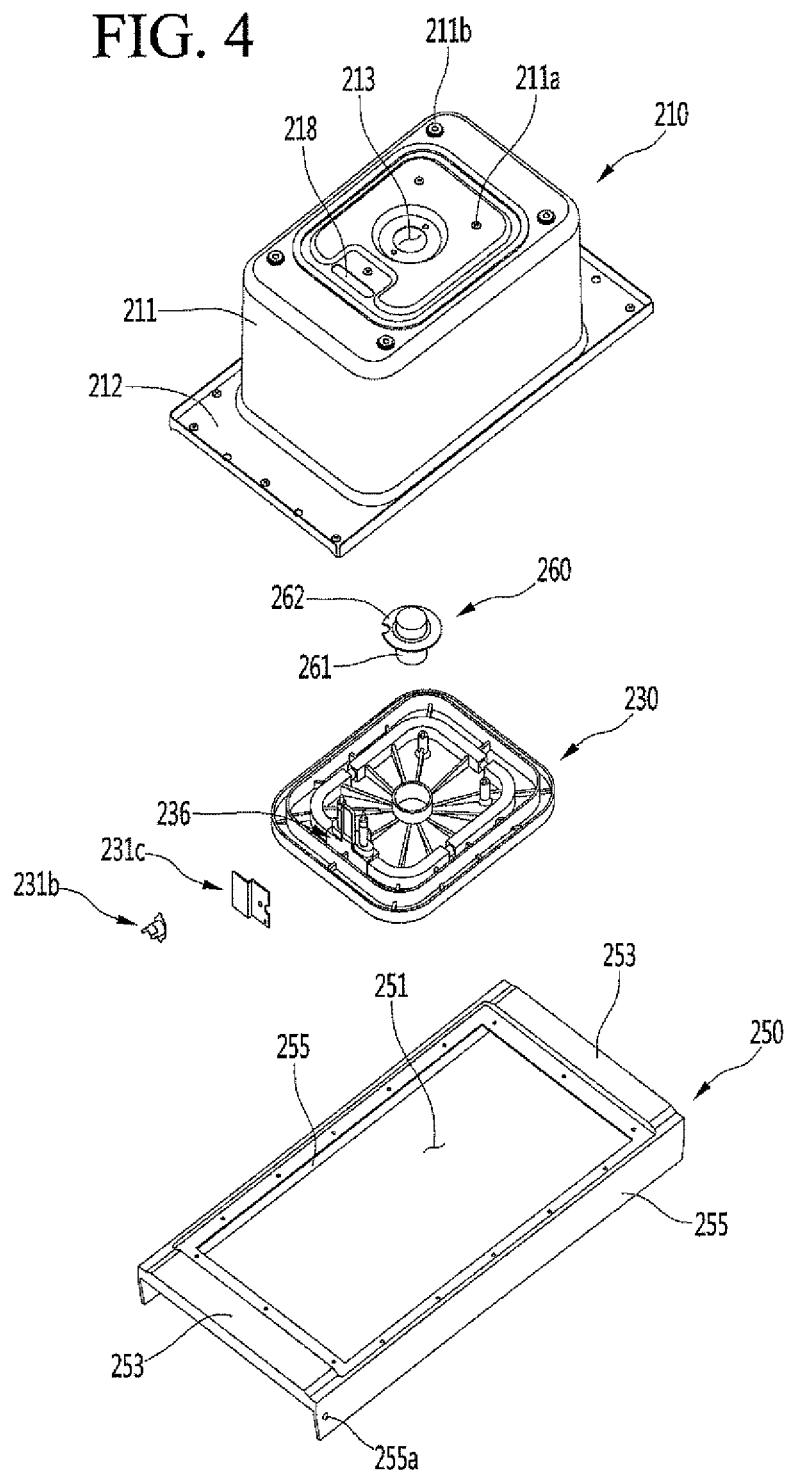
FIG. 4 is an exploded perspective view of the combined structure of the housing and the heating unit of FIG. 3, as viewed from below.

FIG. 1 is a perspective view of a cooking apparatus according to an embodiment, as viewed from above. FIG. 2 is a perspective view of the cooking apparatus of FIG. 1, as viewed from below. FIG. 3 is an exploded perspective view of a combined structure of a housing and a heating unit of the cooking apparatus of FIG. 1, as viewed from above. FIG. 4 is an exploded perspective view of the combined structure of the housing and the heating unit of FIG. 1, as viewed from below.

Cooking apparatus 200 according to an embodiment may include a housing 210 forming a receiving space 210a, a heating unit 230 mounted inside the housing 210, and a door 240 that opens and closes the receiving space 210a. The cooking apparatus 200 may include the housing 210, the heating unit 230, and the door 240. The apparatus 200 may further include a separate casing in which the housing 210 may be mounted. Thus, the apparatus 200 may be an independent cooking apparatus which may be used independently.

Of course, if desired, the configuration including the housing 210, the heating unit 230, and the door 240 may be mounted on a composite type cooking apparatus or cooktop. Alternatively, the configuration including the housing 210, the heating unit 230, and the door 240 may be mounted in a kitchen appliance or furniture in a built-in form to act as a component of the composite type cooking apparatus or cooktop.

The housing 210 may be formed of a steel material, for example. The housing 210 may include a receiving portion 211 forming a receiving space of a container 220 and a flange 212 formed around an open top face of the receiving portion 211. An inner surface of the receiving portion 211 and a top face of the flange 212 may be coated with enamel. Further, a frame 250 may be further disposed on the flange 212. The frame 250 may be coupled with the flange 212 and may form an outer circumference of a top surface of the housing 210. The frame may be rotatably mounted on the door 240.

A frame opening 251 is defined in a center of the frame 250. A top face of the housing 210 may be coupled to a periphery of the frame opening 251. Further, the frame 250 may be larger than the top face of the housing 210. At a rear end of the frame, a frame recess 252 for mounting the door 240 thereon may be provided. The frame 250 may be mounted within the frame recess 252, whereby the frame 250 may be opened or closed.

An inside of the receiving portion 211 has a recessed space for accommodating the container 220 for cooking food. A top of the receiving portion 211 may be opened. Further, a bottom face of the receiving portion 211 may define a face on which the heating unit 230 may be placed.

Further, a base hole 213 may be formed in a bottom of the housing 210. A temperature sensing device 260 may be mounted in the base hole 213. Further, a safety fuse 231b may be mounted on the bottom of the housing 210.

The door 240 may be mounted on the frame 250. The door 240 may also be configured to open and close the open top face of the housing 210. Further, at least a portion of the door 240 may be transparent or translucent. With this structure, the receiving space 210a inside the housing 210 may be viewed therethrough from the outside.

Figure 5:
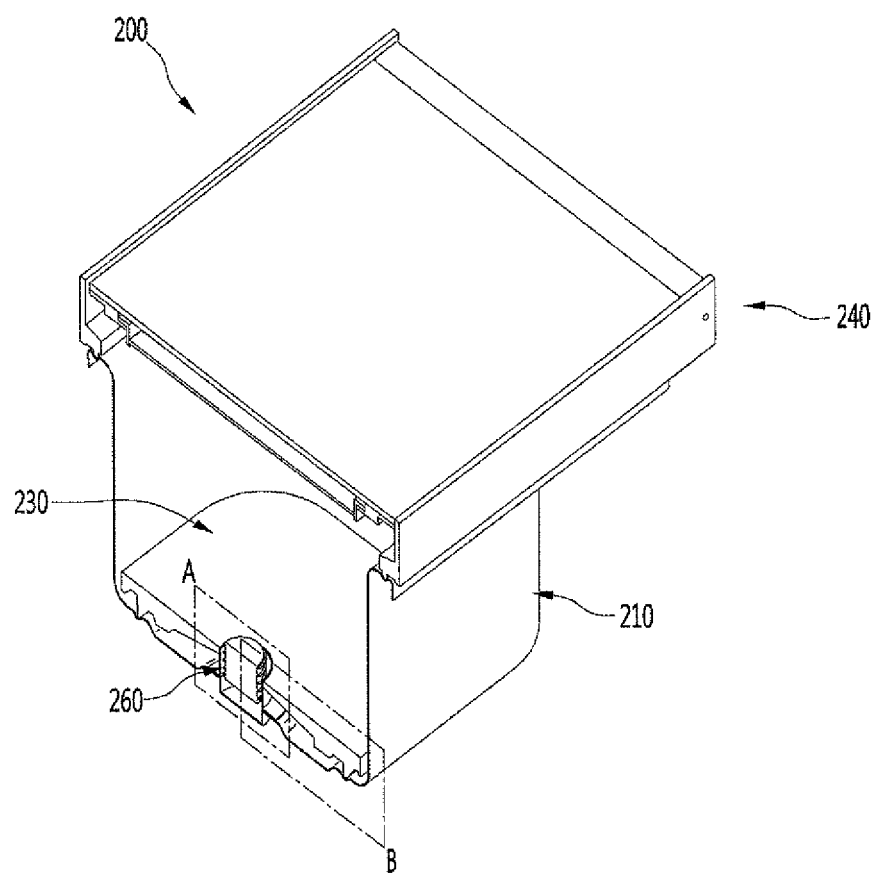
FIG. 5 is a cut-away perspective view of the cooking apparatus of FIG. 1.
Figure 6:
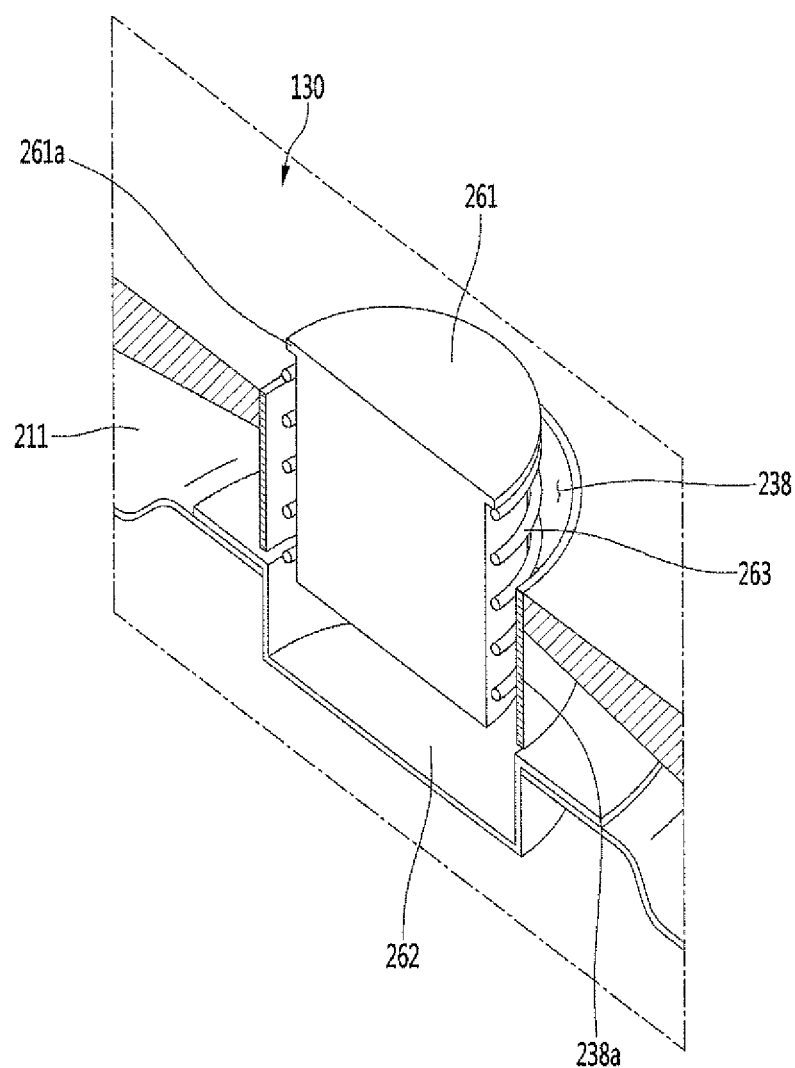
FIG. 6 is an enlarged view of portion A of FIG. 5.
Figure 7:
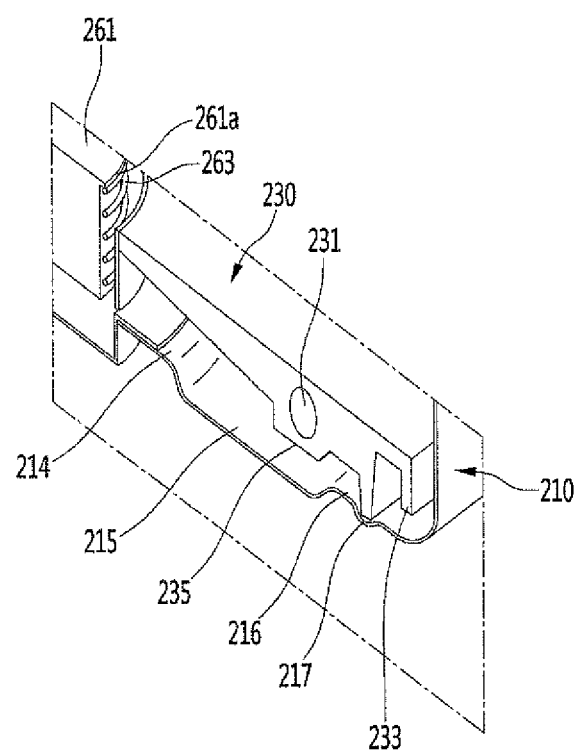
FIG. 7 is an enlarged view of portion B of FIG. 5.

FIG. 5 is an exploded perspective view of the cooking apparatus of FIG. 1. FIG. 6 is an enlarged view of portion A of FIG. 5. FIG. 7 is an enlarged view of portion B of FIG. 5.

Referring to the figures, the base hole 213 may be formed at a center of the receiving portion 211. The temperature sensing device 260 may be mounted in the base hole 213. Further, the temperature sensing device 260 may contact the heating unit 230 while being mounted on the base hole 213, and thus, may measure a temperature of the heating unit 230.

The temperature sensing device 260 may include a temperature sensor 261 that is in contact with the heating unit 230, a base plate 262 that shields the base hole 213, and an elastic member 263 that elastically supports the temperature sensor 261. The base plate 262 may shield the base hole 213. The base plate 262 may be recessed so that the temperature sensor 261 may be received therein. Further, the base plate 262 may pass through a wire connected to the temperature sensor 261.

The temperature sensor 261 may extend through a center hole 238 of the heating unit 230 and then protrude into the receiving portion 211. The temperature sensor 261 may include a temperature sensing or measuring device, such as a thermistor, or thermostat, for example.

The temperature sensor 261 may be supported by the elastic member 263. The elastic member 263 may be formed in a spring shape. The elastic member 263 may be configured such that both ends of the elastic member 263 support the base plate 262 and the temperature sensor 261, respectively. An elastic member support 261a, which may support an upper end of the elastic member 263, may laterally protrude from an upper end of the temperature sensor 261. Thus, the temperature sensor 261 may be located inside the elastic member 263. The upper end of the elastic member 263 may be in contact with the elastic member support 261a and a lower end of the elastic member 263 may be in contact with the base plate 262.

A top face of the temperature sensor 261 may be held by the elastic member 263 so as to protrude further higher than a bottom surface of the receiving portion 211 and a top face of the heating unit 230. Further, when the container 220 is mounted in the receiving portion 211, the temperature sensor 261 remains in contact with the container 220 so that the sensor may accurately measure a temperature of the container 220.

The base hole 213 may be formed in a first protrusion portion or protrusion 214 relatively protruding inside the receiving portion 211. A height of the first protrusion 214 may be larger than a height of the lower end of the inner rib 234. Therefore, it is possible to prevent water from penetrating into the base hole 213.

Further, a first recess 215 may be formed around the first protrusion 214. The first recess 215 may prevent moisture from penetrating beyond the first protrusion 214 into the base hole 213.

Further, a second protrusion portion or protrusion 216 may be formed on or at an outer side of the first recess 215. The second protrusion 216 may be formed along a circumference of the first recess 215. Further, a second recess 217 may be formed around the second protrusion 216. Thereby, moisture may be prevented from penetrating beyond the second protrusion 216 into the second recess 217 and the base hole 213.

That is, on the bottom face of the receiving portion 211, convex and concave structures may be repeatedly formed, as it extends away from a center of the base hole 213. Further, the bottom face of the receiving portion 211 may have at least two grooves or protrusions. Thus, moisture may be prevented from leaking to the base hole 213. Leakage of water downwardly in the receiving portion 211 through the base hole 213 may be doubly blocked.

Further, a portion of the second protrusion 216 may have a through-hole 218. The through-hole 218 allows mounting of the terminal 231a of the heater 231 constituting the heating unit 230, and the safety fuse 231b and the fuse bracket 231c. The through-hole 218 may be formed in a shape corresponding to a connection portion 236 protruding from the heating unit 230. Therefore, the terminal 231a of the heater 231 and the safety fuse 231b may be mounted on the connection portion 236 protruding downward through the through-hole 218.

Further, the bottom face of the receiving portion 211 may have an engagement hole 211a to which a fastener 211c for mounting the heating unit 230 may be fastened. Further, in each of four corners of the bottom surface of the receiving portion 211, a mount hole 211b for engagement with a mounting bracket when the cooking apparatus 200 is mounted on a separate casing forming the external shape, a composite type cooking apparatus or a cooktop may be further formed.

Figure 8:
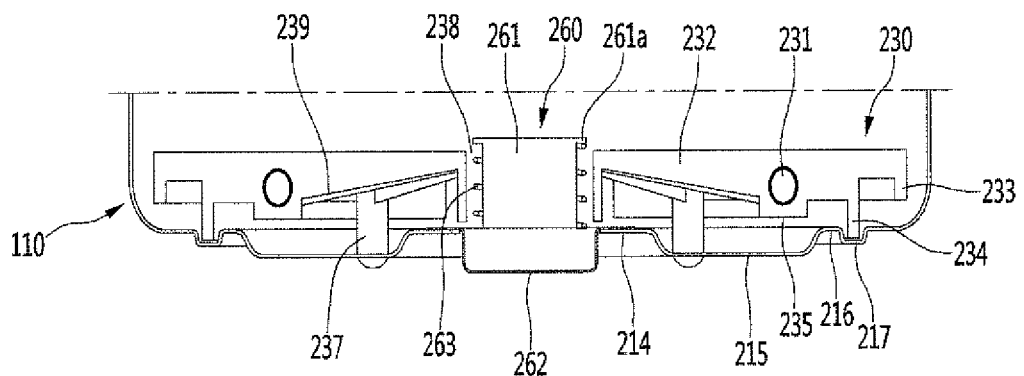
FIG. 8 is a horizontal cross-sectional view of a lower portion of the cooking apparatus of FIG. 1.
Figure 9:
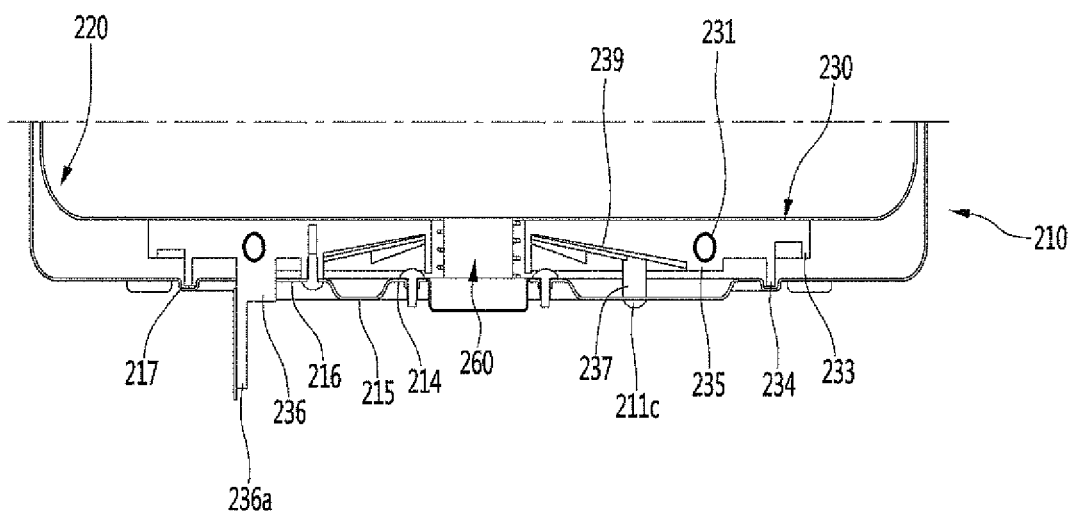
FIG. 9 is a vertical cross-sectional view of the lower portion of the cooking apparatus of FIG. 1.
Figure 10:
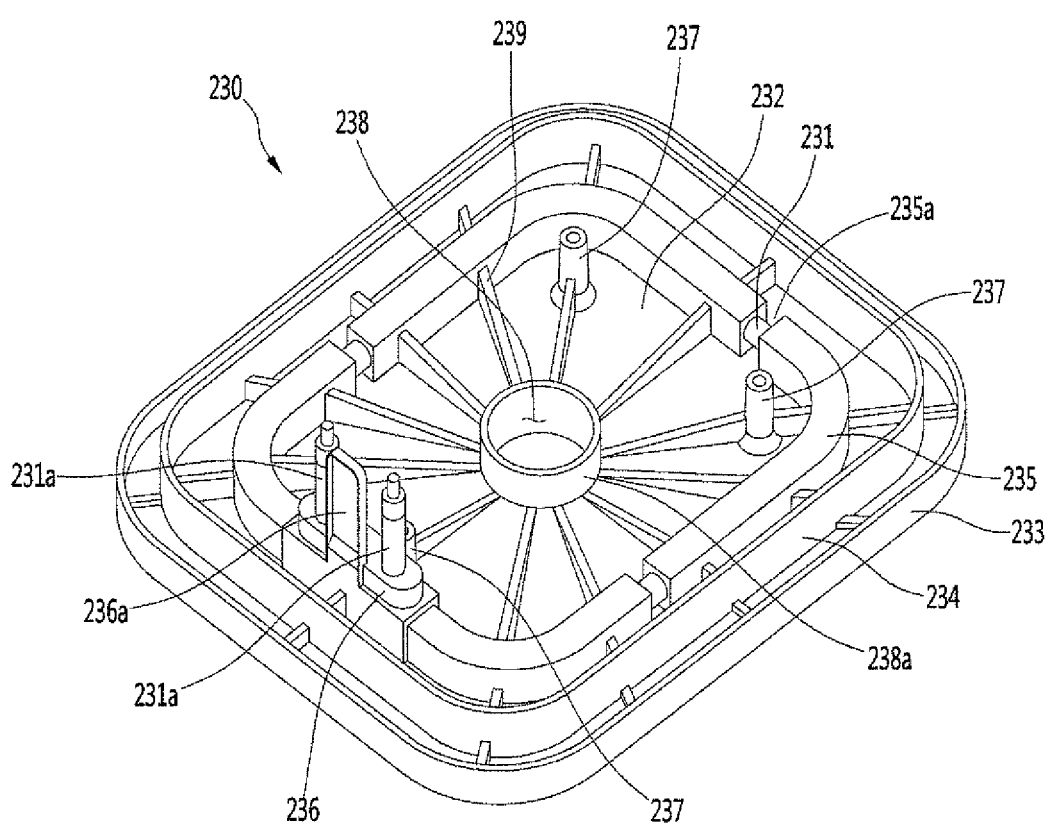
FIG. 10 is a perspective view showing a bottom face of the heating unit according to an embodiment.

FIG. 8 is a cross-sectional view of a lower portion of the cooking apparatus of FIG. 1. FIG. 9 is a vertical sectional view of the lower portion of the cooking apparatus of FIG. 1. FIG. 10 is a perspective view showing a bottom face of the heating unit according to an embodiment.

As shown in the figures, the heating unit 230 may be provided on the bottom face of the receiving portion 211. A shape of the heating unit 230 may be a rectangular shape with rounded corners. The shape of the heating unit 230 may be formed so as to cover most of the bottom surface of the receiving portion 211.

The heating unit 230 may be larger than the second recess 217. That is, when the heating unit 230 is mounted thereon, all of the components inside the second recess 217, including the second recess 217, may be covered by the heating unit 230.

The heating unit 230 may include a heating unit body 232 forming most of an area of a bottom supporting the container 220. The heating unit 230 may further include a heater 231 provided in the heating unit body 232 so as to heat the heating unit body 232.

The heating unit body 232 may be formed of a metal, such as aluminum or an aluminum alloy, having excellent heat-transfer performance. The heating unit body 232 may be formed by a die casting method. Further, at a time of forming the heating unit body 232, the heater 231 may be insert-injected. Accordingly, by operating the heater 231, the heating unit body 232 may be heated. The heating unit body 232 may upwardly support the container 220 inside the receiving portion 211 and simultaneously heat the container 220.

With respect to the heating unit body 232, a top face of the heating unit body 232 may be planar and may support the container 220. Further, a bottom face of the heating unit body 232 may have a concavo-convex shape corresponding to a concavo-convex shape of the receiving portion 211. Therefore, even when water or food inside the container 220 floods and thereby flows into the bottom of the receiving portion 211, the concavo-convex shape protruding downward from the bottom face of the receiving portion 211 and the heating unit body 232 may prevent the water from flowing into a central portion of the housing 210 and then leaking to the outside.

An outer rib 233 extending downward along an outer periphery of the heating unit body 232 may be formed. The outer rib 233 may extend toward the bottom face of the receiving portion 211. When the heating unit body 232 is mounted, the outer rib 233 may have a length such that the outer rib may be somewhat spaced from the bottom face of the receiving portion 211. The outer rib 233 may be parallel to an inner wall surface of the receiving portion 211 and may be spaced apart from the inner wall surface by a predetermined distance.

Further, inside the outer rib 233, an inner rib 234 may be formed on the bottom face of the heating unit body 232. The inner rib 234 may be spaced apart from the outer rib 233 by a predetermined distance. The inner rib 234 may be formed along an inner side of the outer rib 233. The inner rib 234 may be formed at a position corresponding to a position of the second recess 217. The inner rib 234 may be disposed along the second recess 217 and inserted into the second recess 217. The inner rib 234 may contact the bottom of the second recess 217 and may support the heating unit 230. The inner rib 234 may extend more downwardly than the outer rib 233.

Foreign material or water overflowing from the container 220 may be primarily blocked by the second recess 217 and the inner rib 234. The water passing through the second protrusion 216 may be prevented from flowing into the central region by the first recess 215 and the first protrusion 214.

That is, even when the foreign material or water overflowing from the container 220 passes through the second recess 217 and the inner rib 234, the first recess 215 and the first protrusion 214 may allow further penetration of the water to be blocked. The first recess 215 may define a relatively large space. Therefore, the water introduced into the first recess 215 may be naturally evaporated by the heat of the heating unit 230. Further, the first recess 215 may be recessed deeper than a depth of the second recess 217 for more effective collection.

Further, in an inner region of the inner rib 234, a heater mounting portion 235 may be formed therein. The heater mounting portion 235 may have a lower height than the inner rib 234. The heater 231 may be received within the heater mounting portion 235. Upon molding the heating unit body 232, the heater 231 may be insert-injected while the heater 231 is being inserted at a position corresponding to the heater mounting portion 235.

Therefore, a remaining portion of the heater 231 except for the terminal 231a to which the wire is connected may be accommodated in the heater mounting portion 235. The heater mounting portion 235 may have a larger cross-sectional area than that of the heater 231 such that the heater 231 may be received within the heater mounting portion 235. The heater mounting portion 235 may be formed along a path along which the heater 231 is disposed.

Further, at least one cut-out 235a may be formed in the heater mounting portion 235. The cut-out 235a may be formed by cutting a portion of the heater mounting portion 235. The heater 231 may be exposed to the outside through the cut-out 235a. Thereby, upon insert-injection of the insert of the heater 231, an arrangement of a jig for securing the heater 231 can be achieved. Thereby, the heater 231 may be insert-injected at a correct position. Furthermore, as the heater 231 may be exposed downwardly of the heating unit 230 through the cut-out 235a, a mounting state of the heater 231 may be visually checked after the heating unit body 232 is formed.

The connection portion 236 may be formed on or at one side of the heater mounting portion 235 so as to expose both opposing terminals 231a of the heater 231 therethrough. The connection portion 236 may have a shape projecting from the heater mounting portion 235. Both opposing terminals 231a of the heater 231 may be exposed in a vertically extending manner and pass through the through-hole 218. A shape of the connection portion 236 may be a shape corresponding to a shape of the through-hole 218. The connection portion 236 may completely shield the through-hole 218. The through-hole 218 may be exposed through a bottom face of the housing 210.

In one embodiment, a fuse installation portion 236a may extend from the connection portion 236. The connection portion 236 and the fuse installation portion 236a may be integrally formed with the heating unit body 232 when the heating unit body 232 is molded. The fuse installation portion 236a may extend to pass through the through-hole 218 as well. Accordingly, when the heating unit 230 is mounted inside the receiving portion 211, the connection portion 236 may be exposed to the outside of the housing 210. The fuse installation portion 236a and the terminal 231a of the heater 231 constituting the connection portion 236 may be exposed to the outside.

Accordingly, the connection operation of the heater 231 outside the housing 210 becomes possible. It is possible to install the safety fuse 231b on the fuse installation portion 236a. The safety fuse 231b may be mounted on the fuse installation portion 236a via a separate fuse bracket 231c.

Inside the heater mounting portion 235, an engagement boss 237 may extend. The engagement boss 237 may be formed to have a number corresponding to the number of fasteners and locations corresponding to locations of the fasteners so that the fasteners 211c from the outside of the housing 210 may be fastened to the engagement boss 237. The engagement boss 237 may protrude more outwardly than the heater mounting portion 235 and the inner rib 234.

By the engagement boss 237, the heating unit 230 may be fixed to the bottom face of the housing 210. A plurality of fasteners 211c may be arranged at even intervals with respect to the central portion of the heating unit 230 for a more stable holding state.

The heating unit 230 may be configured such that the inner rib 234 may be located inside the second recess 217 and contact the bottom face of the second recess 217 in a state in which the heating unit 230 is fixed to the bottom face of the housing 210. Further, a plurality of heat transfer ribs 239 extending radially around the center hole 238 may be formed. The plurality of heat-transfer ribs 239 may be equidistantly spaced and extend radially. Each of the plurality of heat-transfer ribs 239 may extend from the center hole 238 through the heater mounting portion 235, the inner rib 234 to the outer rib 233.

The rib 239 may be heated by heat generated from the heater 231 while the heat transfer rib 239 passes through the heater mounting portion 235. Accordingly, the heat generated by the operation of the heater 231 may be uniformly transferred to the entire area of the heating unit 230 through the heat-transfer rib 239. That is, when the heater 231 is driven, heat transfer through the heat transfer rib 239 allows the entire top surface of the heating unit body 232 to be heated to a uniform temperature. Thus, the bottom face of the container 220 may be uniformly heated.

The heat-transfer ribs 239 may have a shell function such that the top face of the heating unit body 232 has a uniform surface when forming the heating unit body 232. The heat transfer rib 239 may have a reinforcing function so as to withstand a load applied to the heating unit body 232.

Further, a height of the heat transfer rib 239 may decrease toward the center hole 238. At the location of the rib in contact with the center hole 238, the rib may not substantially protrude. Therefore, it is possible to prevent the central portion of the heating unit 230 from being overheated, in which a plurality of heat transfer ribs 239 is concentrated. An outer edge of the heating unit 230, at which the ribs are greatly spaced apart from each other, may be heated more effectively.

In the center of the heating unit body 232, the center hole 238 in which the temperature sensing device 260 may be disposed may be formed. The center hole 238 may have a size corresponding to the size of the temperature sensing device 260. Inside the center hole 238, the temperature sensor 261 and the elastic member 263 may be disposed. The temperature sensor 261 may be moved up and down inside the center hole 238.

Further, a center guide 238a extending downward may be formed around the center hole 238. The center guide 238a may extend to the bottom face of the housing 210 around the center hole 238. The temperature sensing device 260 may be accommodated in a space formed by the center guide 238a.

The temperature sensor 261 and the elastic member 263, which are supported by the elastic member 263 and are arranged to be moved up and down, may be accommodated inside the center guide 238a. Therefore, in a process of moving the temperature sensor 261 up and down, movement of the temperature sensor 261 may be guided by the center guide 238a. The temperature sensor 261 may be prevented from interfering with or contacting with other components.

In a state in which the container 220 is not mounted inside the housing 210, as shown in FIG. 6, the temperature sensor 261 may protrude to a position higher than the top face of the heating unit 230. In a state in which the container 220 is mounted inside the housing 210, as shown in FIG. 9, the temperature sensor 261 may be pressed by the container 220, and accordingly, the temperature sensor 261 may be inserted into the center hole 238 relatively. At this time, the temperature sensor 261 may be maintained in a state in which the temperature sensor 261 is completely in close contact with the bottom face of the container 220 due to the elastic force of the elastic member 263.

Figure 11:
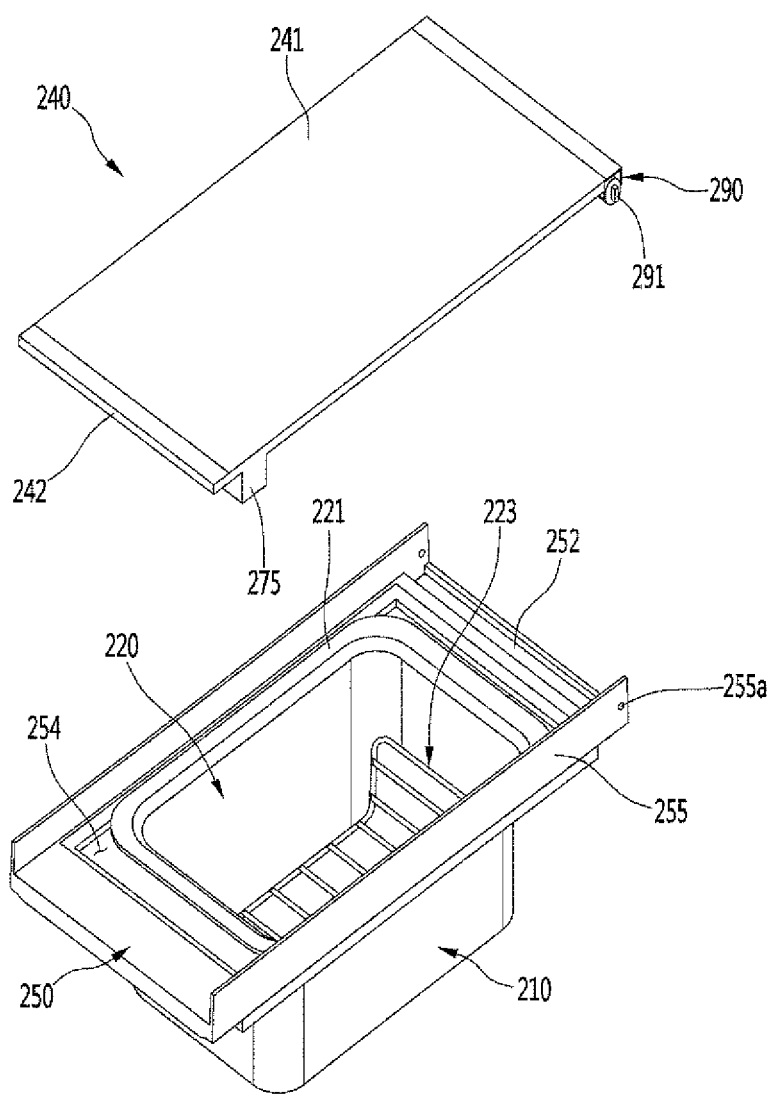
FIG. 11 is an exploded perspective view showing a door of the cooking apparatus being separated from the housing according to an embodiment.

FIG. 11 is an exploded perspective view showing a door of the cooking apparatus being separated from the housing according to an embodiment. Referring to FIG. 3, FIG. 4 and FIG. 11, a flange 212 may be formed on the top face of the housing 210 to provide a surface that can support the frame 250. Further, along the circumference of the flange 212, a plurality of fasteners 212a may be fastened to the flange 212 from below. The fasteners 212a may be engaged with the frame 250 which is seated on the top face of the flange 212. A state in which the frame 250 may be coupled to the housing 210 define one construction, and such a construction may be referred to as a "main body".

The frame 250 provides a space in which the door 240 may be mounted and received. The frame 250 may form an outer appearance of a portion of a circumference of the cooking apparatus 200 exposed to the outside. The frame 250 may be formed of a cast iron material, such as a grating used in a general burner. The frame 250 may be cast molded and have a same texture as embodiments. Thus, the frame 250 may be configured such that an outer surface of a peripheral portion thereof may be formed by the frame 250, and an overall appearance thereof may be harmonized, when the cooking apparatus 200 is mounted on a composite type cooking apparatus equipped with a general burner.

Alternatively or additionally, the frame 250 may provide a support surface 253 that which may be seated on the casing forming the appearance. Thus, the cooking apparatus 200 may be mounted in a module type on a composite type cooking apparatus or cooktop. The supporting surface 235 may be stepped so that at least a portion of the support surface 253 may stably be mounted on the casing.

The frame opening 251 may be formed in the center of the frame 250, such that the receiving portion 211 and the container 220 may be exposed to the outside through the opening 251. The opening 251 may be larger than the container 220 and larger than the open top face of the housing 210.

Further, a step portion or step 254 may be formed around the opening 251. Thereby, there is provided a space in which water overflowing from the container 220, or water flowing down from the door 240, may be introduced and remain. The housing 210 may be coupled to the bottom face of the frame 250, and therefore, a space corresponding to a thickness of the frame 250 may be formed within the opening 251. The space formed by the inside of the opening 251 and by the flange 211 of the housing 210 may be stepped, so that the step 254 may be formed. Further, a periphery of the opening 251 forming the step 254 may be inclined. Thus, the water from the top face of the frame 250 may be directed to the step 254.

Further, a side portion or side 255 extending upward from both lateral edges of the frame 250 may be formed. The side 255 may provide a surface at which both ends of the door 240 may be axially coupled. The side 255 may have a shape that may wrap around the both ends of the door 240 when the door 240 is closed. The side 255 may extend upward from both ends of the frame 250 by a height corresponding to a height of the door 240. The side 255 may extend from a front end to a rear end of the frame 250. In this way, an entire side surface of the door 240 may be covered. Therefore, as shown in FIG. 11, when the door 240 is closed, left and right or lateral side surfaces of the door 240 may not be exposed, while a handle of a front end of the door 240 may be exposed.

A hinge hole 255a into which a shaft 291 of a hinge mechanism 290 that rotates the door 240 may be inserted may be formed at a rear end of the side 255. Accordingly, the door 240 may be pivoted with respect to the hinge hole 255a by the hinge mechanism 290. Thus, the door may open/close an entire top surface of the frame 250.

Further, a frame recess 252 may be formed in or at a rear end of the frame 250. The frame recess 252 may be recessed between both opposing sides 255 formed with the hinge hole 255a. A hinge mounting portion 278 formed on or at the rear end of the door 240 may be received in the recess 252.

The frame recess 252 may not only receive the hinge mounting portion 278, but may also be formed to be further depressed. Accordingly, when the door 240 is opened, and when the water flows over the water guide 284 formed on the bottom face of the door 240, the recess 252 may form a space that may receive water so that water does not flood outside of the cooking apparatus 200.

Thus, the frame recess 252 may be recessed in a shape corresponding to the hinge-mounting portion 278, in order that when the door 240 is closed, the hinge mounting portion 278 may be received in the recess 252. The frame recess 252 may be further spaced from the outer surface of the hinge mounting portion 278 to form a water collectable space.

Figure 12:
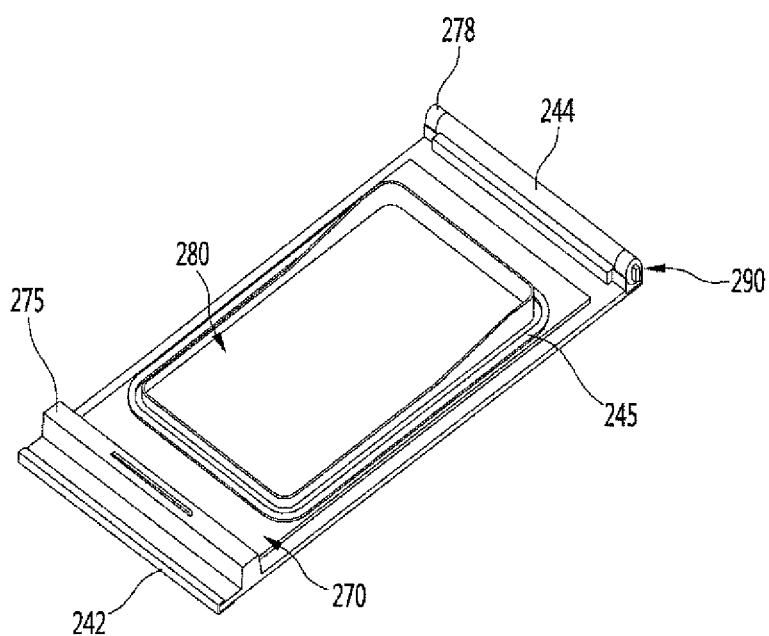
FIG. 12 is a rear perspective view of the door of FIG. 11.
Figure 13:
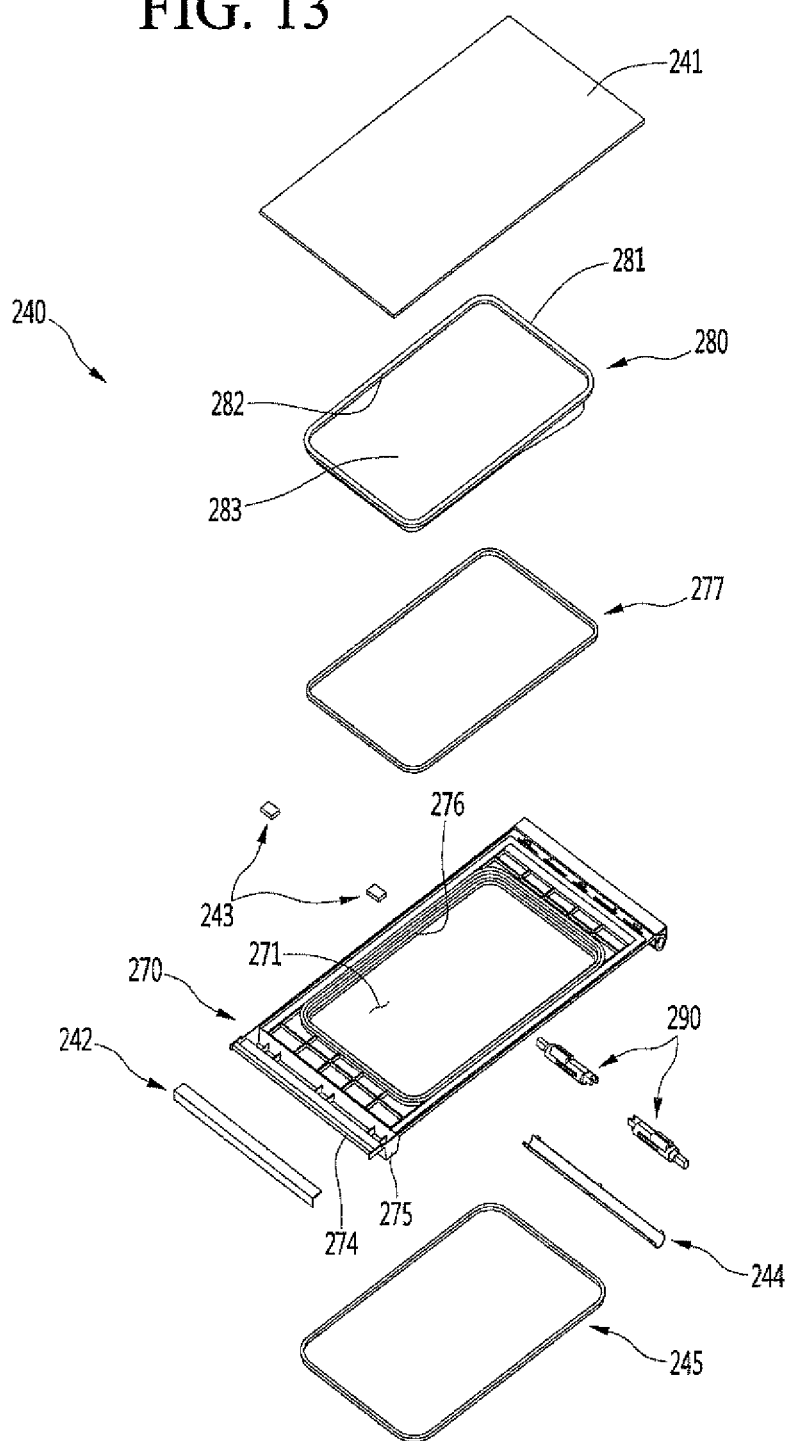
FIG. 13 is an exploded perspective view of the door of FIG. 11.

FIG. 12 is a rear perspective view of the door of FIG. 11. FIG. 13 is an exploded perspective view of the door of FIG. 11.

As shown in the figure, the door 240 may be formed in a plate shape to form a top appearance of the cooking apparatus 200. The door 240 may be formed to open and close the opening 251 of the frame 250 and the opening of the housing 210.

The door 240 may include an outer casing 241, a door base 270, an inner casing 280, and the hinge mechanism 290. The outer casing 241 may form a top appearance of the door 240. The casing 241 may be formed in a plate shape corresponding to the entire top surface of the door 240. The casing 241 may be referred to as an "outer plate". Thus, when viewed from above, most of the top appearance of the cooking apparatus 200 may be formed by the outer casing 241.

The outer casing 241 may be formed of tempered glass or a transparent acrylic material, for example. A surface of the outer casing 241 may be patterned or variously coated or film-treated. Thus, if desired, through the door 240, a user may see through into an interior of the housing 210 or the container 220. Thus, it is possible for the user to view a cooking situation inside the cooking cavity.

The door base 270 may form a frame of the door 240. The outer casing 241, the inner casing 280, and the hinge mechanism 290 may be mounted on the door base 270.

The door base 270 may be injection molded using a plastic material, for example. A base opening 271 may be formed in a center of the door base 270. The base opening 271 may be formed at a position corresponding to the opening of the housing 210. Therefore, when the inner casing 280 and the outer casing 241 become transparent or translucent, the interior of the housing 210 may be visible through the base opening 271. Further, on a top face of the door base 270, the outer casing 241 may be mounted. The entire top surface of the door base 270 may be shielded by the outer casing 241.

A front decoration 242 may be mounted on a front end of the door base 270. The front decoration 242 may form a front end of the door 240 and form a portion of the handle of the door 240. The front decoration 242 may be formed of a metal material or may have a metal-like texture to further enhance the appearance, for example. The front decoration 242 may be mounted on the front end of the door base 270.

Further, a magnet 243 may be provided in the door base 270. The magnet 243 fixes the door by a magnetic force so that the door 240 may be kept closed. The magnet 243 may be provided inside the door base 270. Accordingly, when the door 240 is closed, the magnet 243 may act on one side of the frame 250 or the housing 210, By magnetic force, the door 240 may remain in contact with the frame 250 or the housing 210.

Further, a pair of hinge mechanisms 290 may be provided at a rear end of the door base 270. The hinge mechanisms 290 may be rotatably coupled to each of both sides of the frame 250. The hinge mechanism 290 may serve as a rotary shaft to open and close the door 240. The hinge mechanism 290 may be inserted and mounted within the rear end of the door base 270. The hinge mechanism 290 may be shielded by a hinge cover 244 when the hinge mechanism 290 is mounted.

In one embodiment, a lower gasket 245 may be provided around the base opening 271 of the door base 270. The lower gasket 245 may be configured to seal the inside of the housing 210 or the interior of the container 220. The lower gasket 245 may be configured to contact the top surface of the housing 210 or the container 220 when the door 240 is closed.

The lower gasket 245 may be formed of rubber or silicone material, for example, so as to be elastically deformable. The lower gasket 245 may be formed to contact a container flange 221 bent from an upper end of the container 220.

An inner casing 280 may be mounted on the door base 270. The inner casing 280 may be configured to shield the base opening 271. The inner casing 280 may form a portion of a bottom surface of the door 240 while the inner casing 280 is mounted on the door base 270.

The door base 270 may be formed of a transparent material, for example. Accordingly, the interior of the housing 210 or the interior of the container 220 may be seen through the region of the base opening 271.

A water guide 284 that protrudes downward may be formed on a bottom face of the inner casing 280. The water guide 284 may guide water droplets formed on the bottom face of the door 240 toward the interior of the container 220 when the door 240 is opened. The water guide 284 may have one or a first side at which the hinge mechanism 290 is disposed which is higher than the other or a second side thereof.

Further, the water guide 284 may extend toward the interior of the container 220. The water guide 284 may be formed around an inner surface of the container 220. Thereby, a primary airtightness within the container 220 may be possible. The water guide 284 together with the lower gasket 245 may achieve more effective airtightness for the container 220.

Hereinafter, main components of the door 240 will be described with reference to the drawings.

Figure 14:
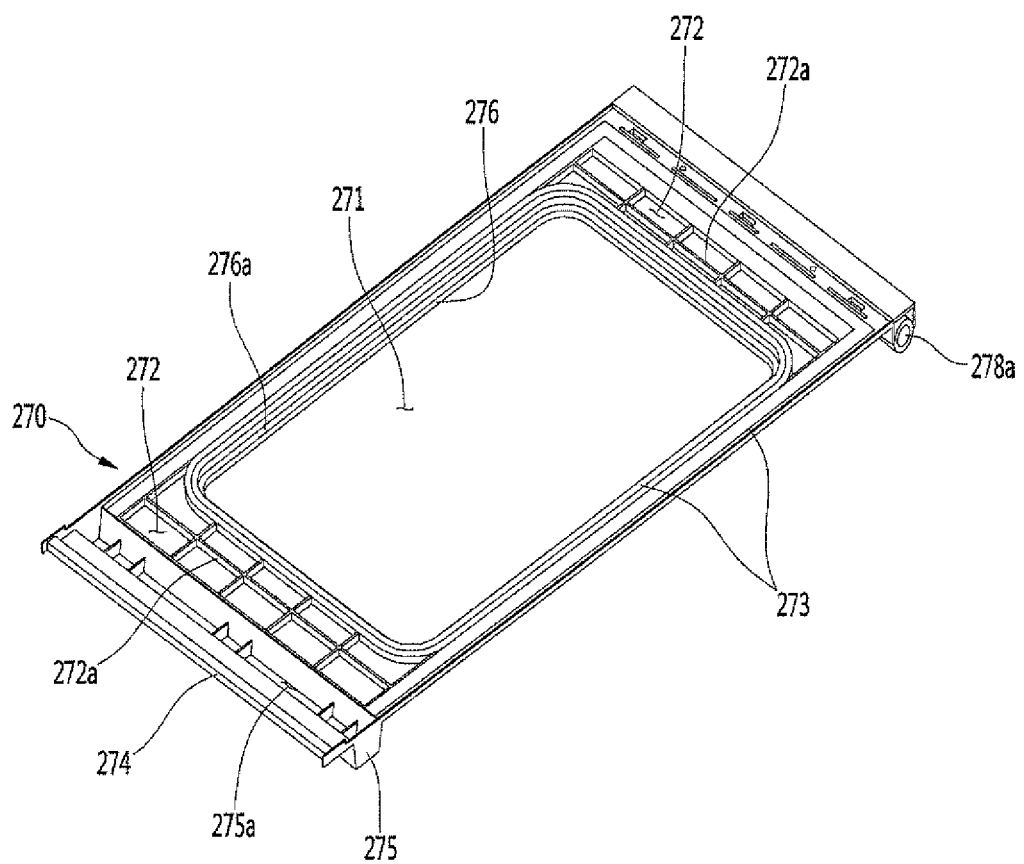
FIG. 14 is a perspective view of a door base of the door of FIG. 11, as viewed from above.
Figure 15:
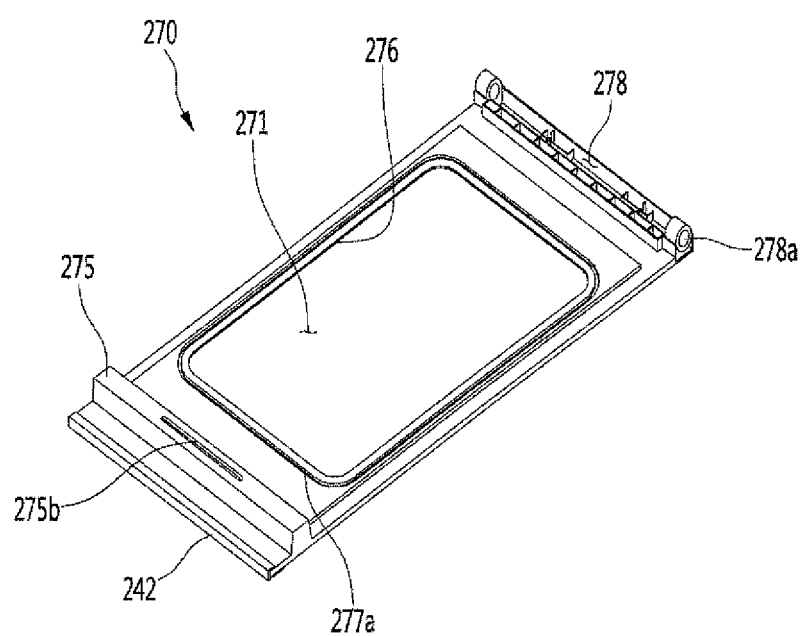
FIG. 15 is a perspective view of the door base of FIG. 14, as viewed from below.

FIG. 14 is a perspective view of a door base according to an embodiment, when viewed from above. FIG. 15 is a perspective view of the door base, when viewed from below.

As shown in the figures, the door base 270 may be formed in a rectangular shape corresponding to a size of an inside of the frame 250. The outer casing 241, the inner casing 280, the lower gasket 245, the front decoration 242, and the hinge mechanism 290, for example, may be mounted on the door base 270.

A plate mounting portion 272 may be formed on the top face of the door base 270. The plate mounting portion 272 may be formed in a size and shape corresponding to the outer casing 241. The plate mounting portion 272 may be recessed to correspond to a thickness of the outer casing 241.

The plate mounting portion 272 may form most of the top surface of the door base 270. Portions of left and right or lateral side faces of the base plate 262 and portions of the front end and the rear end may protrude such that the plate mounting portion 272 may be defined by these protruding portions.

A plate adhering portion 273 to which an adhesive or a sealant may be applied may be formed on an inner region of the plate mounting portion 272. The plate adhering portion 273 may protrude from a region corresponding to a circumference of the outer casing 241 and an outer region of the base opening 271. Thus, the plate adhering portion 273 may maintain a state in which the outer casing 241 is adhered to the plate mounting portion 272.

Further, the base plate 262 may have the base opening 271 formed therein. The base opening 271 may be shielded by the inner casing 280. Through the base opening 271, the interior of the housing 210 may be substantially visible to the outside.

The front decoration 242 may be mounted on the front end of the plate mounting portion 272, that is, on the front end of the door base 270. The front decoration 242 may be formed of a metal material and may form a portion of an outer appearance of the door front end. Further, the rear end of the door base 270 corresponding to the rear end of the plate mounting portion 272 and the both lateral ends of the door base 270 corresponding to both lateral ends of the plate mounting portion 272 may be exposed outside the outer casing 241.

Further, the base portion 271 and the front and rear portions of the door 240 may have a recessed shell region. Further, a grid-shaped reinforcing rib 272a may be formed in the shell region. The bottom face of the door 240 may have a stepped shape due to the shape of the shell region so that the bottom face of the door 240 has left and right or lateral sides positioned above a center thereof.

A decoration mounting portion 274 on which the front decoration 242 may be mounted may be formed on the front end of the door base 270. The decoration mounting portion 274 may protrude forward. The front decoration 242 may be inserted and mounted in the decoration mounting portion 274. Further, a space may be formed below the decoration mounting portion 274. Thus, the portion where the decoration mounting portion 274 is formed may serve as a handle. Accordingly, when the door 240 is closed, a user may put his/her hand into the space formed below the decoration mounting portion 274, and then, the user may lift the door 240 and rotate the door 240. Thereby, the space may provide a gripping space.

Further, on a rear side of the front decoration 242, a support 275 that protrudes downward may be formed. The support 275 may extend downwardly. When the door 240 is closed, the support 275 may be brought into contact with the top face of the frame 250 or the housing 210.

A projection height of the support 275 may be configured as follows: The support 275 may be in contact with the frame 250 or the housing 210 such that when the door 240 is closed, the top face of the door 240 may be kept flush with a floor face or a top face of the cooking apparatus 200. Further, the support 275 may extend from the left or a first end to the right or a second end of the bottom surface of the door base 270.

The top face of the support 275 may have an open and inwardly recessed structure, and a magnet mounting portion 275a may be formed on one side of the inside of the support 275. Therefore, when the door 240 is closed, the door 240 faces the frame 250 due to the magnetic force of the magnet 243, and then, the door 240 may be pressed against the frame 250 by the magnetic force. In this way, the door 240 may be kept closed. Both the magnet mounting portion 275a and the magnet 243 may be provided on each of both sides of the support 275. If desired, the magnet mounting portion 275a and the magnet 243 may be provided at more positions.

Further, a contact portion or contact 275b that projects further downward may be formed on a center of a bottom surface of the support 275. The contact 275b may be substantially in contact with the frame 250 or the housing 210, and may have a rib shape having a predetermined width. Further, the contact 275b may be formed in a round shape such that the contact 275b may be in point contact or line contact with the frame 250 or the housing 210.

Therefore, when the door 240 is closed, the entire bottom surface of the support 275 may not be in contact with the frame 250 or the housing 210, but a portion of the contact 275b may be in contact with the frame 250 or the housing 210. Thereby, noise generated when the door 240 is closed may be minimized. More particularly, due to the magnetic force, noise generated when the door 240 is instantly closed may be prevented. Upon opening the door 240, the door 240 may be opened with an appropriate force to overcome the magnetic force.

An inner casing seat portion or seat 276 may be formed to be stepped inside the plate adhering portion 273. An inner circumference of the inner casing seat 276 may define the base opening 271. The inner casing seat 276 may be formed along a circumference of the base opening 271. On the inner casing seat 276, the casing flange 281 of the inner casing 280 may be supported.

In one embodiment, in a state in which the casing flange 281 is seated in the inner casing 280, a top face of the casing flange 281 may be flush with a top face of the plate adhering portion 273. Adhesive applied on the plate adhering portion 273 may be applied on the casing flange 281. Thus, the plate casing portion 273 and the casing flange 281 may be bonded to the outer casing 241 at the same time.

Further, in the inner casing seat 276, an upper gasket groove 276a for mounting the upper gasket 277 therein may be further formed. The upper gasket groove 276a may be formed as a depressed groove in the inner casing seat 276. Alternatively, the upper gasket groove 276a may be defined by a pair of ribs projecting along the inner casing seat 276.

In one embodiment, a lower gasket mounting groove 277a may be formed in a bottom face of the door base 270. The lower gasket mounting groove 277a may be formed along a circumference of the base opening 271. The lower gasket mounting groove 277a may be located more outwards than the inner casing seat 276.

A position of the lower gasket mounting groove 277a may correspond to a position of the plate adhering portion 273. That is, the plate adhering portion 273 may be formed opposite the lower gasket mounting groove 277a. The plate adhering portion 273 may protrude by a depth of the lower gasket mounting groove 277a.

The lower gasket mounting groove 277a may be fitted with the lower gasket 245. The lower gasket 245 may contact the bottom face of the door 240 and the top face of the housing 210 or the container 220, thereby ensuring airtightness therebetween. Therefore, when the door 240 is closed, the interior of the housing 210 or the container 220 may be kept airtight by the lower gasket 245.

In one embodiment, a hinge mounting portion 278 may be formed on the rear end of the bottom face of the door base 270. The hinge mounting portion 278 may be constructed such that the hinge mechanism 290 composed of a hydraulic or spring damping hinge may be mounted on the hinge mounting portion 278. Thus, when the door 240 is closed, the door 240 is not accelerated by means of the damping type hinge mechanism 290 so that no shock may be generated and the door 240 may be closed slowly. Thus, impact and noise as generated when the door 240 is closed may be minimized.

The hinge mounting portion 278 may be formed on the rear end of the bottom surface of the door base 270. The hinge mounting portion 278 may be opened so that the hinge mechanism 290 may be inserted and mounted in the hinge mounting portion 278. Further, both left and right or lateral ends of the hinge mounting portion 278 may be opened. Thus, with the hinge mechanism 290 being mounted on the hinge mounting portion 278, the hinge shaft 291 may penetrate the hinge mounting portion 278. The hinge mechanism 290 may be coupled into the hinge hole 255a of the frame 250 such that the door 240 may be rotatably mounted.

Figure 16:
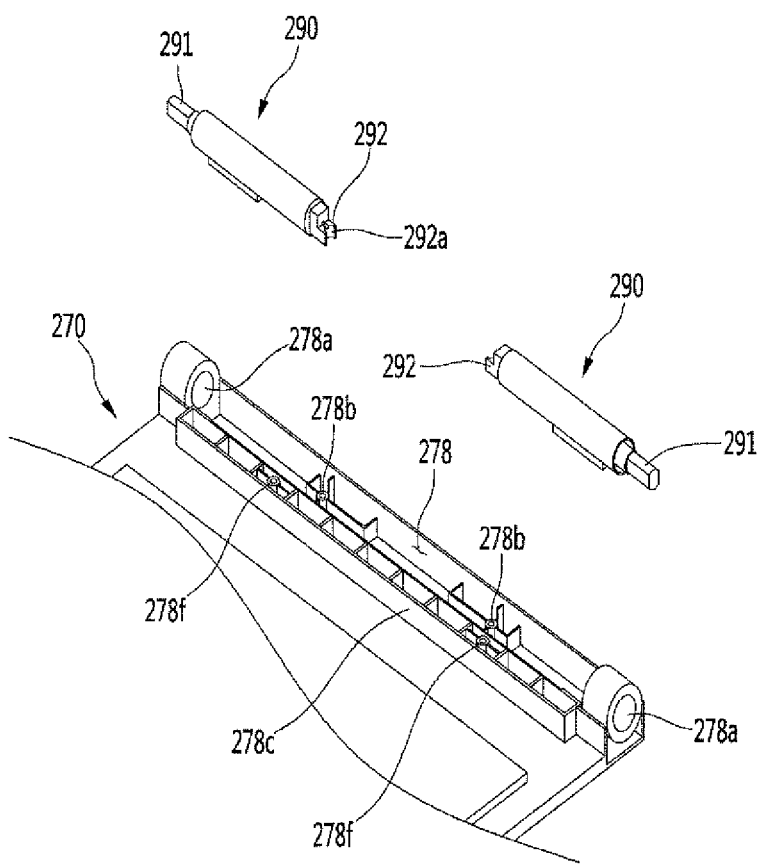
FIG. 16 is an exploded perspective view showing a coupling structure of a hinge mechanism mounted on the door of FIG. 11.
Figure 17:
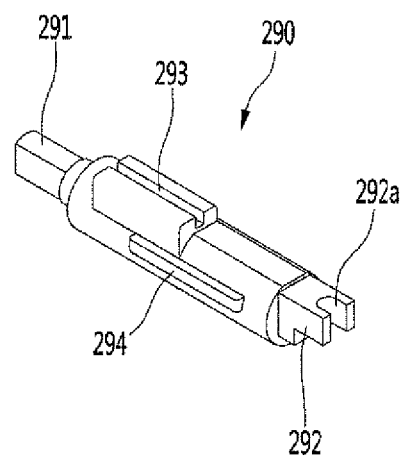
FIG. 17 is a perspective view of the hinge mechanism of FIG. 16.
Figure 18:
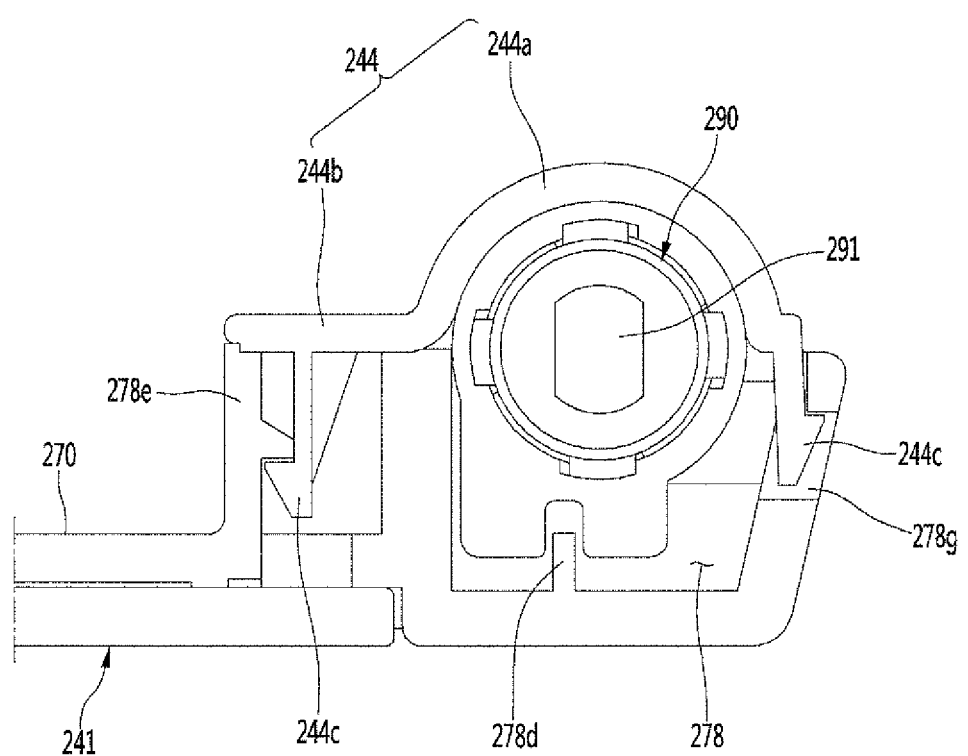
FIG. 18 is a cross-sectional view of the hinge mechanism of FIG. 16 being mounted on the door.

FIG. 16 is an exploded perspective view showing a coupling structure of a hinge mechanism mounted on the door of FIG. 11. FIG. 17 is a perspective view of the hinge mechanism of FIG. 16. FIG. 18 is a cross-sectional view of the hinge mechanism of FIG. 16 being mounted on the door.

As shown in the figure, the hinge mounting portion 278 may be formed on the door base 270. The hinge mounting portion 278 may protrude so that the hinge mounting portion 278 may be received in a frame recess 252 of the rear end of the frame 250. Inside the hinge mounting portion 278, a space for mounting the hinge mechanism 290 therein may be provided. The space may be opened or closed by the hinge cover 244.

The hinge mounting portion 278 may define a space for receiving the hinge mechanism 290 along the rear end of the bottom face of the door base 270. The hinge mounting portion 278 may be opened downward such that the hinge mechanism 290 is inserted into the hinge mounting portion 278.

Further, in both ends of the hinge mounting portion 278, side holes 278a through which the hinge shaft 291 of the hinge mechanism 290 may pass may be formed. The side hole 278a may be opened toward a side of the door 240. The side hole 278a may be formed at a position corresponding to the hinge hole 255a formed in the side 255 of the frame 250. Thus, the hinge shaft 291 of the hinge mechanism 290 mounted on the hinge mounting portion 278 may pass through the side hole 278a and then into the hinge hole 255a.

Each of the hinge mechanisms 290 may be configured to be received in each of the left and right sides of the hinge mounting portion 278. Further, the hinge mechanism 290 may be mounted to have an orientation such that the hinge mechanism 290 may be configured to provide a damping action when the door 240 is closed. The hinge mounting portion 278 and the hinge mechanism 290 have a directional mounting structure.

The hinge shaft 291 may protrude from one or a first end of the hinge mechanism 290, and the hinge shaft 291 may pass through the side hole 278a and then into the hinge hole 255a. Further, a screw engagement portion 292 may be formed on the other or a second end of the hinge mechanism 290 in a direction opposite to the direction in which the hinge shaft 291 protrudes. A screw for fixing may be fastened with the screw engagement portion 292. A screw hole 292a may be formed in the screw engagement portion 292. The screw hole 292a may pass through the screw engagement portion 292. The screw, which is fastened to the hinge mounting portion 278, may penetrate the screw hole 292a. An engagement boss 278b may protrude from the hinge mounting portion 278 to position-correspond to the screw hole 292a. The screw passing through the screw hole 292a may be engaged with the engagement boss 278b. Thus, the hinge mechanism 290 may be kept fixed inside the hinge mounting portion 278.

A fixing slit 293 in which an insertion rib 278d formed on the hinge mounting portion 278 may be inserted may be formed in an outer surface of the hinge mechanism 290. The fixing slit 293 may extend in a longitudinal direction of the hinge mechanism 290. The fixing slit 293 may be constituted by a pair of protrusion portions or protrusions that protrudes toward the bottom face of the hinge mounting portion 278. Further, on the bottom face of the hinge mounting portion 278 corresponding to the fixing slit 293, the insertion rib 278d which projects upwardly may be formed. Upon insertion of the hinge mechanism 290, the insertion rib 278d may be inserted into the fixing slit 293. Thus, the hinge mechanism 290 may be fixed and mounted in place.

Further, on the other or a second side of the outer surface of the hinge mechanism 290, an outwardly protruding confining protrusion portion or protrusion 294 may be formed. The confining protrusion 294 may protrude in a direction perpendicular to the fixing slit 293, and may protrude laterally from the side of the hinge mechanism 290. Further, a protrusion support may be formed on one side wall of the hinge mounting portion 278 corresponding to the confining protrusion 294. The protrusion support may support the confining protrusion 294 or may be coupled to the confining protrusion 294. The confining protrusions 294 may protrude in opposite directions along the left and right hinge mechanisms 290 to prevent the hinge mechanism 290 from being erroneously mounted.

Accordingly, upon mounting the hinge mechanism 290, each of the pair of hinge mechanisms 290 may be mounted at a predetermined position on each of the right and left or lateral sides via the structure of the fixing slit 293 and the confining protrusion 294. Thus, misalignment of the hinge mechanism 290 may be prevented by the directional mounting structure.

In one embodiment, in a state in which the hinge mechanism 290 is mounted on the hinge mounting portion 278, the hinge mounting portion 278 may be shielded by the hinge cover 244. For mounting and maintenance of the hinge mechanism 290, the hinge cover 244 may open and close an open area of the hinge mounting portion 278.

The hinge cover 244 may include a rounded portion 244a and a planar portion 244b. The rounded portion 244a may substantially cover the hinge mechanism 290 and may be configured to shield the opening of the hinge mounting portion 278. The planar portion 244b may be mounted on a protruding protrusion portion or protrusion 278c on the hinge mounting portion 278. Further, a screw may be fastened to the planar portion 244b. In the protrusion 278c, a screw hole 278f into which a screw may be fastened may be formed. The screw may pass through the planar portion 244b and then be engaged with the protrusion 278c. Thus, the hinge cover 244 may be secured to the door base 270. Further, a plurality of the reinforcing ribs 272a for stably supporting the hinge cover 244 may be formed on the protrusion 278c.

A plurality of hooks 244c may be provided at a front end and a rear end of the hinge cover 244. The hook 244c may be fastened to a hook hole 278g formed in the hinge mounting portion 278. Thus, a state in which the hinge cover 244 is mounted on the hinge mounting portion 278 may be maintained. The plurality of hooks 244c may be arranged at regular intervals along the rounded portion 244a and the planar portion 244b. The hook hole 278g may be formed along the rear end of the hinge mounting portion 278, that is, the rear end of the door 240. The hook 244c of the rear end of the hinge cover 244 may be inserted into the hook hole 278g. A further hook hole 278g may be formed in an inner surface of the protrusion 278c. The hook 244c of the front end of the hinge cover 244 may be inserted into the further hook hole 287g.

Figure 19:
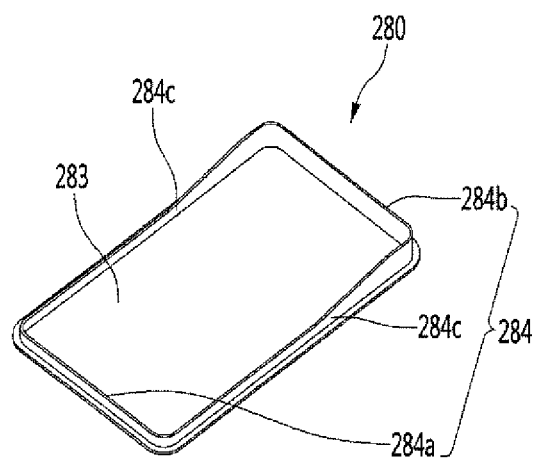
FIG. 19 is a perspective view of an inner casing of the door of FIG. 11, as viewed from below.

FIG. 19 is a perspective view of an inner casing of the door of FIG. 11, as viewed from below. As shown in the figure, the inner casing 280 may be configured to shield the base opening 271, and may be transparent or translucent. Thus, the interior of the housing 210 may be viewed from the outside.

The inner casing 280 may be mounted within the base opening 271. The inner casing 280 may include the casing flange 281 mounted on the inner casing seat 276, a casing edge portion or edge 282 that extends downward from an inner end of the casing flange 281, and a dividing portion or divider 283 that vertically divides the casing edge 282.

The casing flange 281 may extend along a circumferential direction of the inner casing 280 and be seated on the inner casing seat 276. The casing flange 281 may extend so that the casing flange 281 may be in intimate contact with a bottom face of the outer casing 241.

The casing edge 282 may form a peripheral surface of the inner casing 280. Further, the casing edge 282 may extend vertically downward from the inner end of the casing flange 281. An inner space of the casing edge 282 may be shielded by the divider 283.

The divider 283 may form a plane inside the inner casing 280. The divider 283 may be formed between the casing flange 281 and a lower end of the casing edge 282. The divider 283 may be formed at a lower height than the casing flange 281. With the inner casing 280 being mounted on the door base 270, the divider 283 may have a lower height than the opening of the door base 270.

Therefore, when the door 240 is assembled, a space may be formed between the divider 283 of the inner casing 280 and the outer casing 241. This space may be hermetically sealed by contact between the inner casing 280 and the outer casing 241, so that the space may be a heat insulating space. That is, the door 240 may provide a vacuum or airtight insulation structure by the outer casing 241 and the inner casing 280. Using the upper gasket 277, such a sealing structure and a heat insulating structure may be achieved.

The water guide 284 may be formed on a bottom face of the divider 283. The water guide 284 may be formed along a periphery of the divider 283. Thus, in the structure of the inner casing 280 formed as single body, the casing edge 282 may be further extended to form the water guide 284.

The water guide 284 may be formed along the periphery of the divider 283. The water guide 284 may be formed to correspond to an opening area of the container 220. Further, the water guide 284 may be located inside the container 220 when the door 240 is closed. When the door 240 is closed, the water guide 284 may be inserted into the container 220.

Further, the water guide 284 may be composed of a lateral face portion or face 284c, a front face portion or face 284a, and a rear face portion or face 284b. The front face 284a may protrude along and from a front end of the divider 283 closer to the handle and the front decoration 242. The front face 284a may be formed to have a relatively lower height compared to remaining portions of the water guide 284. If necessary, the front face 284a may be omitted. That is, the water guide 284 may not be formed at the front end of the divider 283.

The rear face 284b may protrude along and from a rear end of the divider 283 closer to the hinge mechanism 290. Further, the rear face 284b may be formed to have a highest height compared to remaining portions of the water guide 284.

Further, a height of the lateral face 284c may be increased as the lateral face 284c extends from the front end to the rear end. A height of the lateral face 284c may gradually increase from a center of the divider 283 to the rear end or from a portion somewhat more rearwards than the central portion to the rear end.

Accordingly, in a process of opening the door 240, water droplets formed on the bottom face of the inner casing 280 may flow toward the rear of the door 240 which is axially coupled. Water flowing along the water guide 284 may not fall outside of the container 220, and most of the water may flow into the container 220 as the water guide 284 is formed inside the container 220 or is formed to guide the water toward the container 220.

Hereinafter, operation states of the cooking apparatus 200 having the above structure will be described with reference to the drawings.

Figure 20:
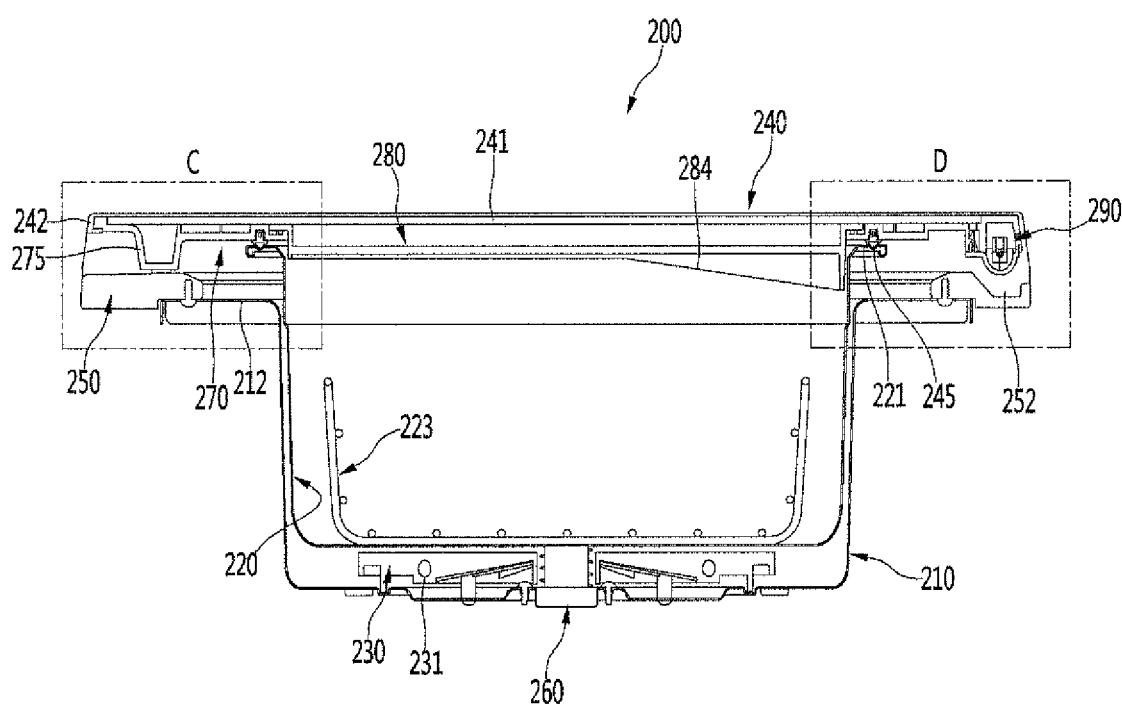
FIG. 20 is a vertical cross sectional view of the cooking apparatus of FIG. 1.
Figure 21:
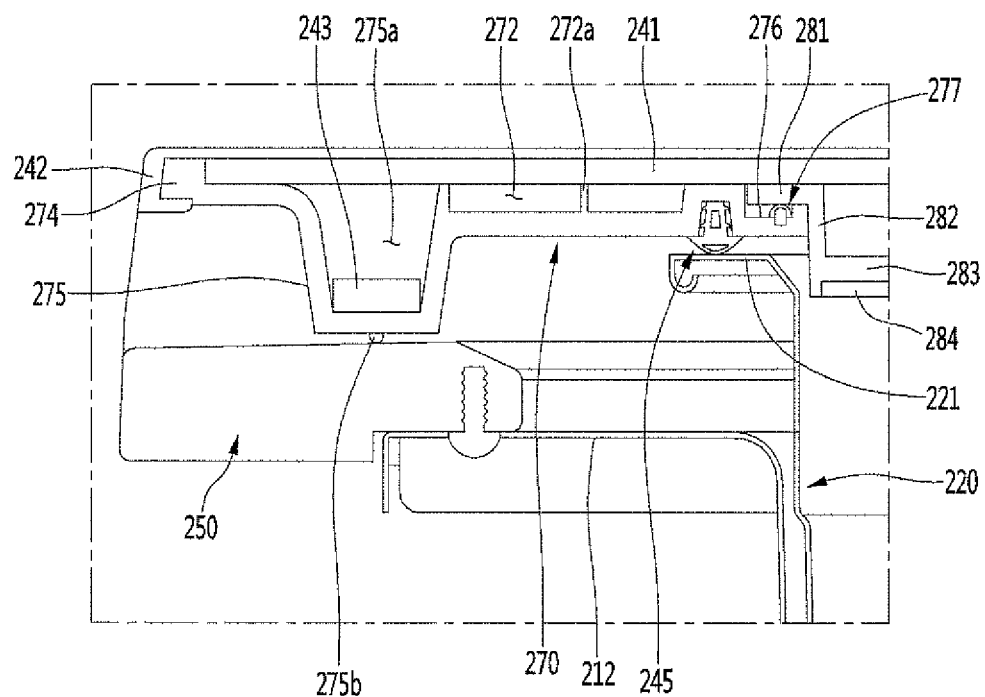
FIG. 21 is an enlarged view of portion C of FIG. 20.
Figure 22:
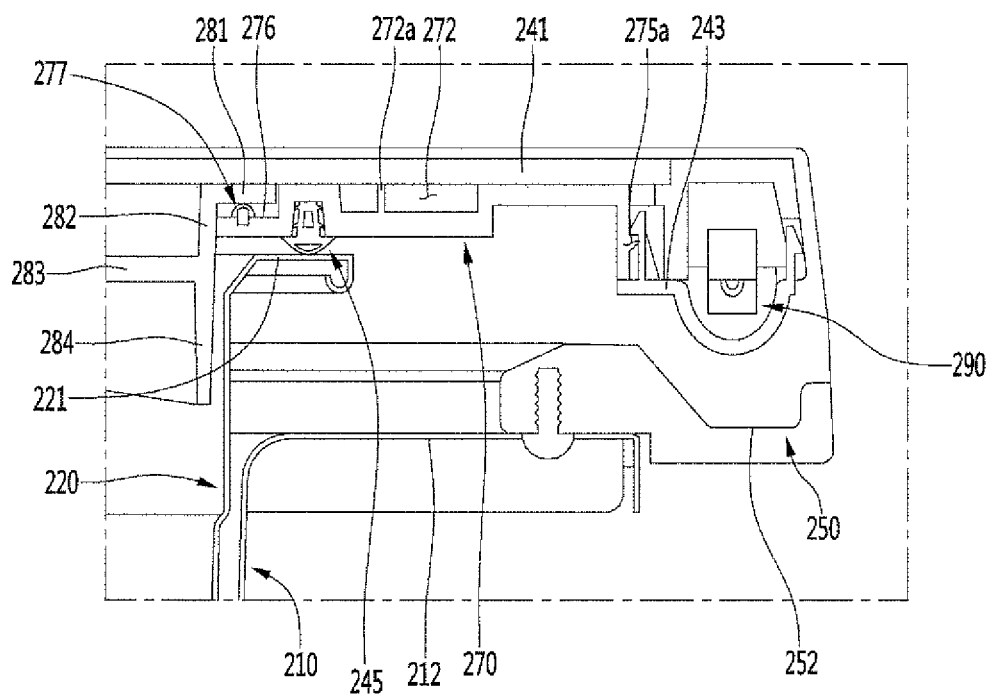
FIG. 22 is an enlarged view of portion D of FIG. 20.
Figure 23:
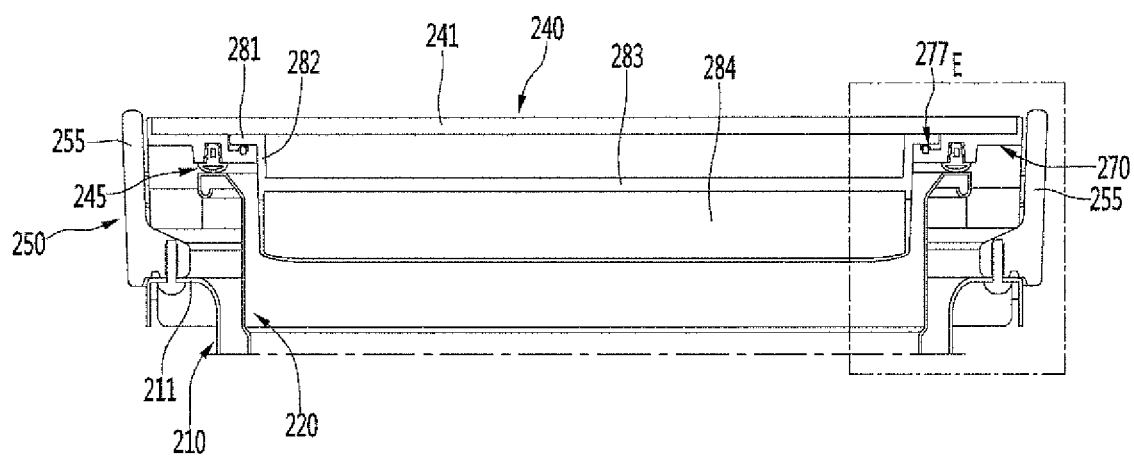
FIG. 23 is a horizontal cross-sectional view of an upper portion of the cooking apparatus of FIG. 1.
Figure 24:
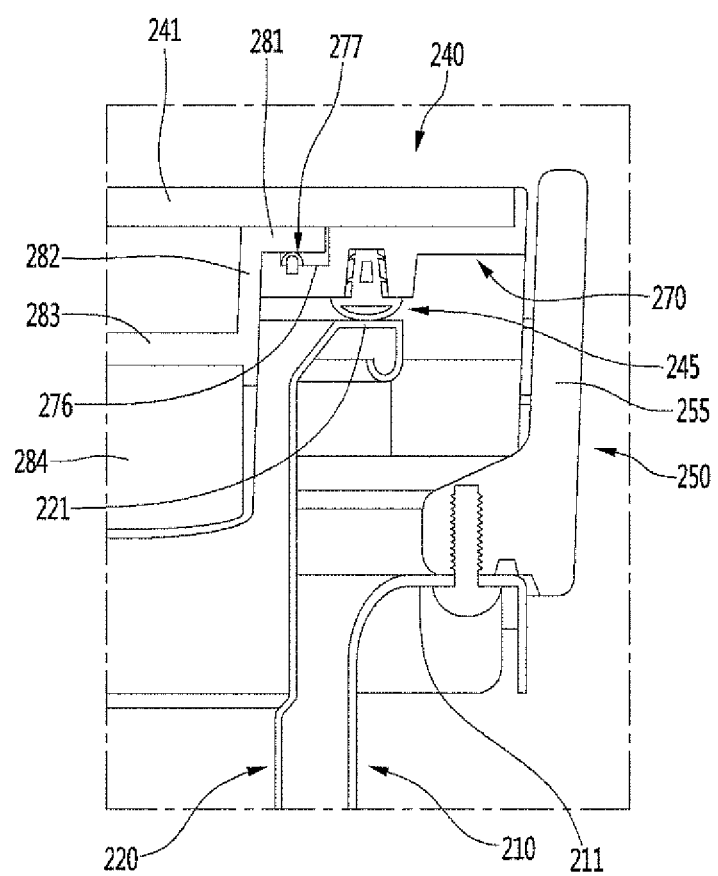
FIG. 24 is an enlarged view of portion E of FIG. 23.

FIG. 20 is a vertical sectional view of the cooking apparatus of FIG. 1. FIG. 21 is an enlarged view of portion C of FIG. 20. FIG. 22 is an enlarged view of portion D of FIG. 20. FIG. 23 is a horizontal cross-sectional view of an upper portion of the cooking apparatus of FIG. 1. FIG. 24 is an enlarged view of portion E of FIG. 23.

As shown in the figure, for operation of the cooking apparatus 200, the container 220 may be disposed inside the housing 210 with food being received inside the container 220. The container 220 may be a container in which food and/or water for cooking are received, and may be formed of stainless steel.

The container 220 may be formed in a container shape having a open top face, and an upper end of the container 220 may protrude higher than a top face of the housing 210. Further, the container 220 may be configured to receive the edge 282 including the water guide 284 when the door 240 is closed. Further, on the upper end of the container 220, the container flange 221 may be provided which is bent outward so that the bent portion is in contact with the lower gasket 245 when the door 240 is closed. The container 220 may further include a rack 223 capable of adjusting an arrangement height of food to be contained therein.

In order to cook sous vide using the cooking apparatus 200, water may be filled in the container 220 at an appropriate water level. A user may mount food to be cooked on the rack 223. Further, the user may fill the container 220 with water, and insert the food into the container 220. The user may close the door 240 and seal the interior of the container 220.

When the door 240 is closed, the heating unit 230 may be heated by operation of the heater 231. The heating of the heating unit 230 allows the water in the container 220 and the container 220 to be heated. The temperature sensing device 260 may sense the temperature of the container 220. The operation of the heater 231 may be controlled by the temperature sensing device 260. Thus, the container 220 may be heated by the heating unit 230 so that the container 220 may be maintained at a set or predetermined temperature.

In one embodiment, during operation of the cooking apparatus 200, the door 240 remains closed. By means of the lower gasket 245, the interior of the container 220 may be maintained in an airtight state. When the door 240 is closed, the lower gasket 245 may contact the top face of the container 220. Due to self-weight of the door 240 or the magnetic force of the magnet 243, the gasket 245 may be further pressed against the housing 210 or the container 220 and may be brought into close contact with the housing 210 or the container 220.

Thus, the interior of the housing 210 or the interior of the container 220 may be in a hermetic state. In this hermetic state, sous vide cooking is performed. Using the above configuration, the interior of the housing 210 may be heated while being maintained at a constant temperature. The housing 210 may be heated while being more effectively insulated from the outside of the housing 210. Further, steam generated during the heating of the interior of the container 220 does not flow out to the outside of the container 210.

In addition to air tightness by the lower gasket 245, the casing edge 282 of the inner casing 280 may be inserted through the opening of the container 220. The casing edge 282 may be disposed adjacent to an inner circumferential surface of the container 220, as shown in FIG. 21 and FIG. 22. Thereby, discharge of steam may be structurally additionally blocked.

Further, as shown in FIG. 24, the upper gasket 277 may contact the bottom face of the casing flange 281, thereby completely sealing the space between the inner casing 280 and the door base 270. In particular, the upper gasket 277 may ensure airtightness between the casing flange 281 and the door base 270. Further, the upper gasket 277 may support the inner casing 280 and the outer casing 241 such that the top face of the inner casing 280 and the bottom face of the outer casing 241, which are in contact with each other may be pressed against each other. In this way, the space between the inner casing 280 and the outer casing 241 may be hermetically sealed.

Accordingly, steam or moisture generated in the housing 210 or the container 220 during operation of the cooking apparatus 200 does not infiltrate between the inner casing 280 and the door base 270 or between the inner casing 280 and the outer casing 241.

That is, when steam or moisture permeates the inside of the door 240 having a structure capable of making a cooking state transparent to the user, visibility through the door 240 is remarkably deteriorated. However, in one embodiment, due to placement of the upper gasket 277, the internal viewing through the door 240 may be assured.

In one embodiment, upon completion of the operation of the cooking apparatus 200 or during its operation, the user may open the door 240 and open the container 220. Water droplets formed on the bottom surface of the door 240, that is, the bottom face of the inner casing 280, may be moved to the rear portion thereof to which the hinge mechanism 290 is coupled. Due to the water guide 284, the flowing water may be naturally guided toward the interior of the container 220. In this way, water flowing out of the container 220 may be minimized.

Figure 25:
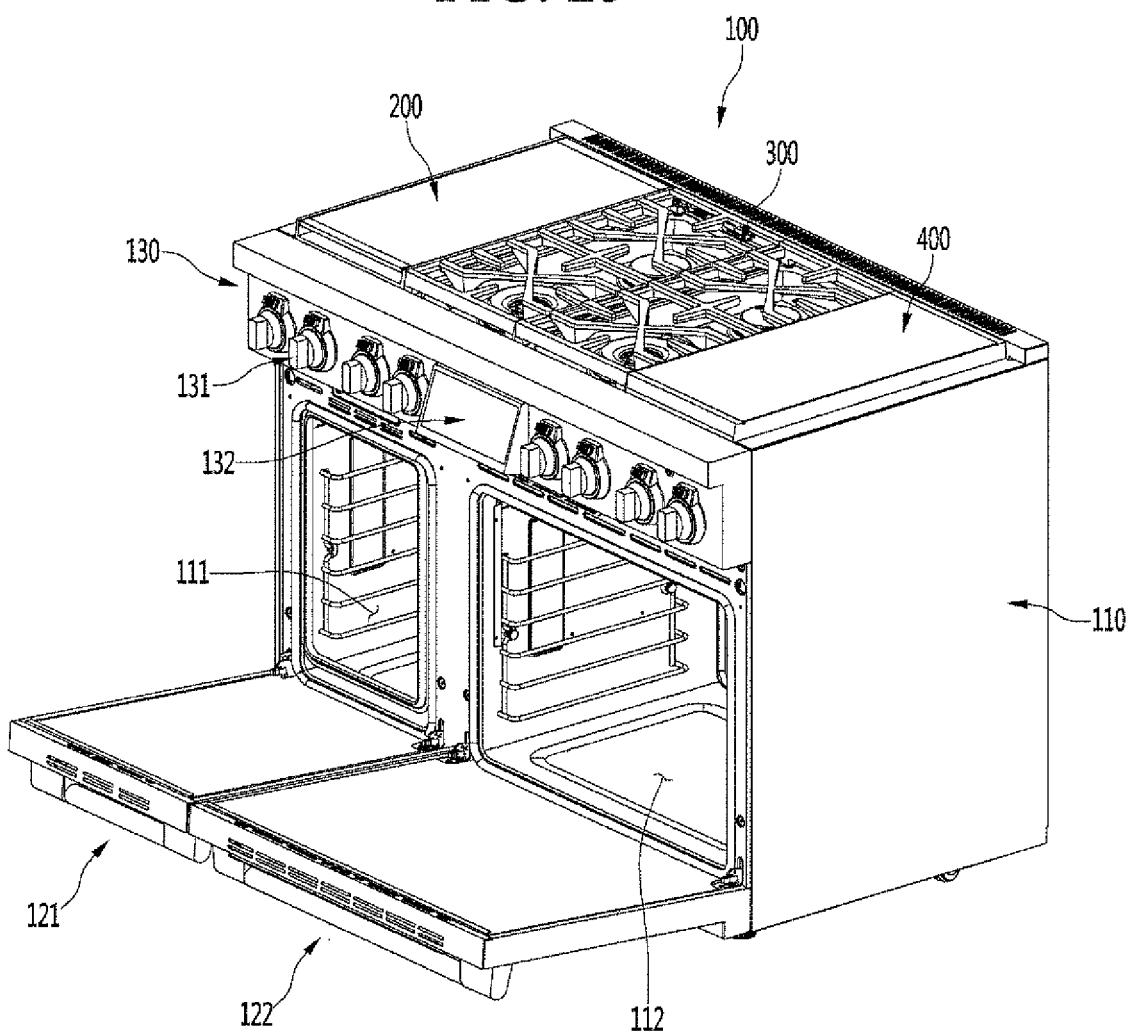
FIG. 25 is a perspective view of a composite type cooking apparatus equipped with the cooking apparatus according to an embodiment.
Figure 26:
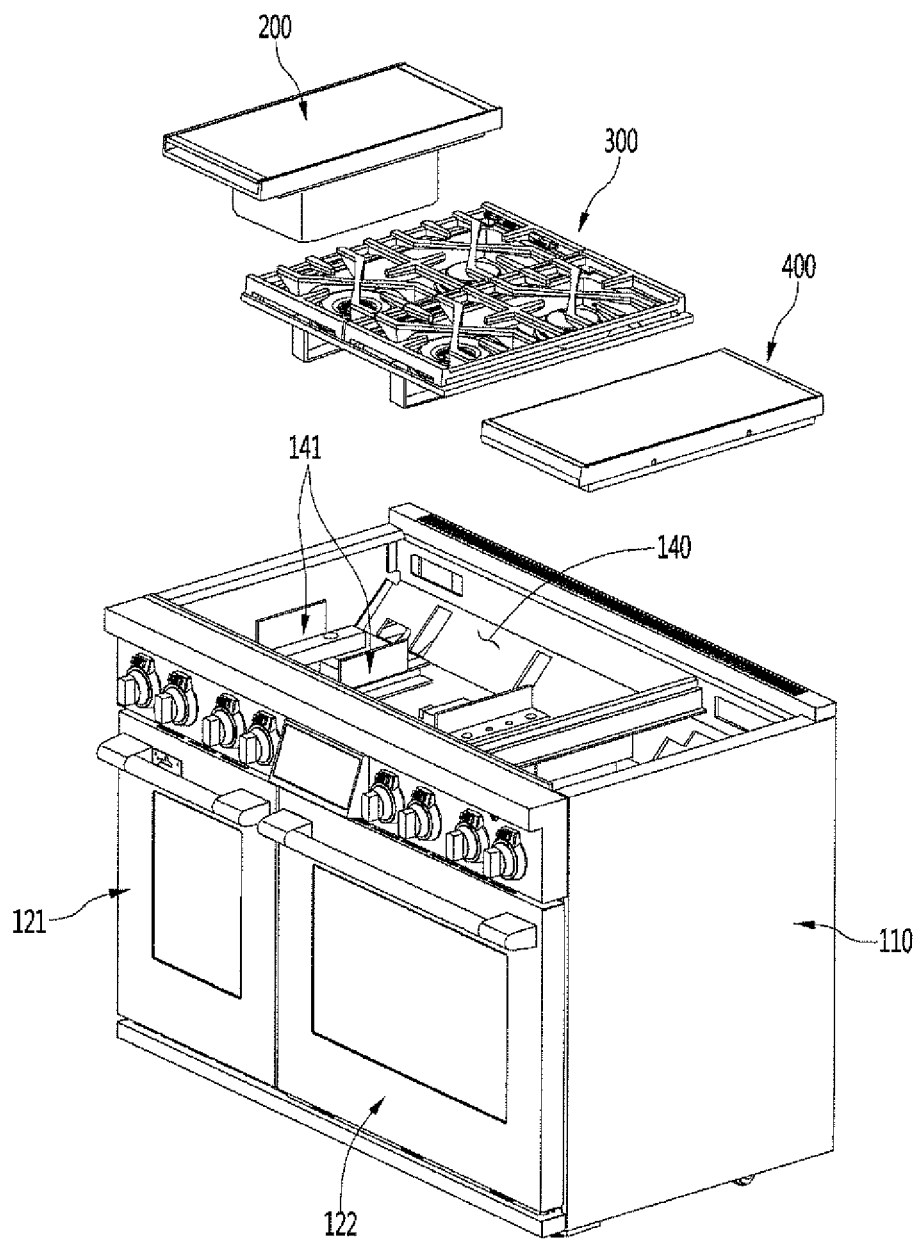
FIG. 26 is an exploded perspective view showing a state in which the cooking apparatus according to an embodiment is separated from the composite type cooking apparatus.

FIG. 25 is a perspective view of a composite type cooking apparatus equipped with the cooking apparatus according to an embodiment. FIG. 26 is an exploded perspective view showing a state in which the cooking apparatus according to an embodiment is separated from the composite type cooking apparatus.

As shown in the figure, cooking apparatus 200 according to an embodiment may be provided as a component of a composite type cooking apparatus 100 in which a plurality of cooking apparatuses may be combined with each other. The cooking apparatus 200 according to an embodiment realizes different cooking functions, but has a structure best suited for sous vide cooking. Thus, the cooking apparatus 200 according to an embodiment may be referred to as a sous vide cooking apparatus 200.

The composite type cooking apparatus 100 may include a main body 100 having oven cavities 111 and 112 formed therein; oven doors 121 and 122 rotatably mounted on the main body 100; a manipulation unit 130 to operate the composite type cooking apparatus 100; the sous vide cooking apparatus 200 provided on a top face of the composite type cooking apparatus 100; a burner cooking apparatus 300; and an induction cooking apparatus 400. The main body 100 may form an overall appearance of the composite type cooking apparatus 100. In the main body, the oven cavities 111 and 112 opened forward may be provided.

The oven cavities 11 and 112 may be composed of a first cavity 111 and a second cavity 112 arranged horizontally in the main body. The heater and the fan provided in the oven cavity may allow an object to be heated and cooked. Further, the oven doors 121 and 122 may be rotatably mounted on the main body 100. The oven doors 121 and 122 may open and close the first cavity 111 and the second cavity 112, respectively. The oven doors 121 and 122 may include a first door 121 that opens and closes the first cavity 111 and a second door 122 that opens and closes the second cavity 112.

The manipulation unit 130 may be provided on an upper end of a front surface of the main body 100. The manipulation unit 130 may include a plurality of knobs 131 operated by a user to operate the composite type cooking apparatus 100 and a display 132 that displays an operation state of the composite type cooking apparatus 100. The manipulation unit 130 may control all of the oven and the sous vide cooking apparatus 200, the burner cooking apparatus 300, and the induction cooking apparatus 400 constituting the composite type cooking apparatus 100. In particular, the operation of the manipulation unit 130 may realize independent operation of the sous vide cooking apparatus 200.

In one embodiment, a top face of the main body 100 may be configured to be open. The main body 100 may provide a mount space 140 in which the sous vide cooking apparatus 200, the burner cooking apparatus 300, and the induction cooking apparatus 400 are mounted. In the mount space 140, the sous vide cooking apparatus 200, the burner cooking apparatus 300, and the induction cooking apparatus 400 may be independently mounted in a modular manner.

More particularly, in the mount space 140, a mount bracket 141 that supports the sous vide cooking apparatus 200 from below may be provided at a position at which the sous vide cooking apparatus 200 is mounted. Therefore, the sous vide cooking apparatus 200 may be fixed and mounted on the mount bracket 141. Further, a front end and a rear end of the sous vide cooking apparatus 200 may be seated on an upper end of the main body 100, that is, both ends of the main body 100 corresponding to a front end and a rear end of the mount space 140, respectively. Thus, the sous vide cooking apparatus 200 may be maintained at a stable mounted state.

In one embodiment, in a state in which the sous vide cooking apparatus 200, the burner cooking apparatus 300, and the induction cooking apparatus 400 are all mounted in the mount space 140, top faces of the sous vide cooking apparatus 200, the burner cooking apparatus 300, and the induction cooking apparatus 400 may be flush with each other. Thus, the top face of the main body 100 may have an integrated structure as a whole. The mount space 140 may further receive a separate mount bracket that supports the burner cooking apparatus 300 and the induction cooking apparatus 400 so as to maintain them at a same height. In addition to the burner cooking apparatus 300 and the induction cooking apparatus 400, other cooking apparatuses may be mounted in the main body 110 in a modular manner.

Embodiments disclosed herein provide a cooking apparatus with improved usability. Embodiments disclosed herein further provide a cooking apparatus with improved insulation performance. Embodiments disclosed herein also provide a cooking apparatus with improved heating performance.

Embodiments disclosed herein provide a cooking apparatus having a structure that may be modularly mounted on one side of a composite type cooking apparatus. Embodiments disclosed herein provide a cooking apparatus having a common mounting structure between a plurality of modularized cooking devices.

Embodiments disclosed herein further provide a cooking apparatus that prevents water or foreign material in the housing from leaking to the outside. Additionally, embodiments disclosed herein provide a cooking apparatus that prevents water from penetrating into an electric device.

Embodiments disclosed herein provide a cooking apparatus with improved heating efficiency of a heating unit. Embodiments disclosed herein also provide a cooking apparatus that allows the entire heat unit to heat evenly.

Embodiments disclosed herein provide a cooking apparatus that may include a housing having an open top surface and having a cooking space formed therein; a door provided on a top of the housing to open and close the cooking space; a container inserted into the housing, the container having an open top surface to receive food to be cooked therein; and a heating unit provided in the housing and contacting a bottom surface of the container to heat the container. The heating unit may include a heating unit body defining a support surface that supports the container; and a heater provided in the heating unit body.

The apparatus may further include a rib that extends downward from the heating unit body to prevent water or foreign material from entering between the heating unit and a bottom of the housing; and a recess formed in a bottom surface of the housing at a position corresponding to the rib. The rib may be received in the recess. The rib may include an outer rib that extends along an outer periphery of the heating unit; and an inner rib spaced apart from the outer rib and disposed inwardly from the outer rib and extending along the heating unit.

A recess may be formed in a bottom surface of the housing. The recess may be in contact with a lower end of the inner rib.

The outer rib may be shorter than the inner rib. A lower end of the outer rib may be spaced apart from the bottom surface of the housing.

The heating unit body may be made of a metal material. The heater may be formed in a state in which the heater is disposed in the heating unit body.

A heater mounting portion may protrude downward from the heating unit body and may extend along the heating unit body. The heater may be housed within the heater mounting portion. The heater mounting portion may be partially cut-away to form a cut-out through which the heater is exposed to an outside.

The heating unit may further include a heat-transfer rib. The heat-transfer rib may extend from a center of the heating unit to an outer edge of the heating unit. The heat-transfer rib may include a plurality of heat-transfer ribs that extends radially from the center of the heating unit and passing through the heater mounting portion. A height of each heat-transfer rib may gradually increase as the heat-transfer rib goes from the center of the heating unit to the outer edge thereof.

A connection portion may protrude downward from a bottom surface of the heating unit at a location more inwardly than the rib. A terminal of the heater may pass through the connection portion to be inserted therein or drawn out therefrom. A through hole may be formed in the bottom surface of the housing in a shape corresponding to the connection portion, such that the connection portion and the terminal of the heater are exposed to an outside of the housing through the through hole.

A fuse-mounting portion in which a fuse that prevents overheating of the heater is mounted may be formed on the connection portion. The fuse-mounting portion may be exposed to an outside of the housing through the through hole.

The apparatus may further include a center hole that passes through the heating unit; and a temperature sensing device housed inside the center hole and contacting the container to sense a temperature thereof. The temperature sensing device may include a base plate that blocks a base hole passing through the housing; a temperature sensor in contact with the container to sense a temperature thereof; and an elastic member provided on the base plate and supporting the temperature sensor thereon to maintain the temperature sensor in contact with the container. A center guide may be formed around the center hole and extend to the bottom surface of the housing to guide a movement of the temperature sensor.

A bottom of the housing may have a protrusion portion or protrusion that protrudes upwards to a height larger than a lower end of the rib. The center hole may be formed on the protrusion portion.

A bottom of the housing may include a first protrusion portion or protrusion protrudes from the bottom of the housing. A temperature sensing device in contact with the container to sense the temperature may be mounted on the first protrusion portion; and a second protrusion portion or protrusion that protrudes from the bottom of the housing. The second protrusion portion may be positioned more outwardly than the first protrusion portion. The second protrusion portion may be formed along the rib to contact an inner surface of the rib. The first protrusion portion and the second protrusion portion may be positioned higher than the lower end of the rib.

A downwardly recessed first recess may be formed between the first protrusion portion and the second protrusion portion. A second recess constructed to receive the rib may be disposed to be outwardly away from the first recess.

A bottom surface of the heating unit may have an engagement boss that protrudes downwardly. A fastener that passes through the housing from an outside of the housing may be fastened to the engagement boss. The engagement boss may be positioned more inwards than the rib.

The rib may be formed along a periphery of the heating unit. The rib may be positioned more outwards than a plurality of openings formed in the housing.

A gasket may be formed on a bottom surface of the door to contact an upper end of the container to allow airtightness between the container and the door. An inner portion of the door defined by the gasket may be transparent so that an interior of the container is visible to an outside.

A cooking apparatus according to embodiments has at least the following advantages.

The heating unit according to embodiments is provided with the rib extending toward the bottom of the housing. Thus, the rib may prevent water or foreign material overflowing from the container from leaking out through the bottom of the housing. Therefore, there is an advantage that contamination or breakage of furniture in which the cooking apparatus is disposed or a composite type cooking apparatus on which the cooking apparatus is mounted may be prevented.

The rib may be composed of the outer rib and inner rib to effectively block the foreign material and water. In addition, the inner rib may be accommodated in the recess of the housing, to prevent the water and foreign material from penetrating through the bottom of the housing more effectively.

The first protrusion portion and the second protrusion portion may be formed on the bottom face of the housing to minimize infiltration of water or foreign material. Further, the recess may be formed in the bottom face of the housing to prevent water or foreign material which has been introduced from being stored without infiltrating, thereby preventing leakage.

The rib may be located more outwards than a position on the heating unit or on the bottom of the housing where the electric device is mounted. The openings in the housing bottom are also located more inwards than the rib. This may provide a structure capable of preventing a short circuit of the electric device and simultaneously preventing water leakage.

The temperature sensing device mounted on the housing may be mounted on the protruding part or portion from the bottom surface of the housing. This may prevent leakage into the temperature sensing device.

When cooking with water, for example, in sous vide cooking, the embodiments may block the outflow of water or foreign material to the outside of the housing. As a result, the embodiments may be mounted on a general furniture or a composite type cooking apparatus in a form of a module, and thus, may be safely used.

The heating unit may be formed of a metal material. The heater may be insert-injected into the heating unit. Thus, heat transfer to the heating unit may be effectively performed and assembling workability may be improved at the same time.

Further, in the heating unit, the radially extending radial ribs may be disposed across the heater mounting portion. Accordingly, heat may be uniformly transferred to the entirety of the heating unit, thereby improving heating efficiency.

Also, each of the radially extending ribs has a smaller height in the narrower center of the heating unit, and each rib has a height increasing toward the broader outer edge region. Thus, the center of the heating unit may be prevented from being locally heated. Thus, the entire heating unit uniformly heats so that the container may be heated more quickly and uniformly. More particularly, it may be expected that the heating performance may be remarkably improved in the case of cooking the sous vide in which the food is cooked for a long time at a relatively low temperature.

The heater may be insert-injected inside the heating unit so as not to be exposed to the inside of the housing, thereby preventing the heater from contacting with water or foreign material inside the housing.

The temperature sensing device may protrude from the center hole of the center of the heating unit and contact the container. The center guide may extend to the housing and around the center hole. Thereby, up and down or vertical movement of the temperature sensor may be guided and interference may be prevented. Thus, the temperature sensing performance of the container may be improved, and the heating and temperature sensing performance may be guaranteed.

The bottom face of the door for opening and closing the housing is provided with the gasket which is in contact with the container in a hermetically sealed manner. Thus, the inner space of the container may be effectively sealed. Therefore, improvement of the heat insulation performance may be achieved, and the temperature inside the container space may be maintained, so that the cooking performance may be remarkably improved.

Further, the inner portion of the door as defined by the gasket may be made to be transparent such that the inside of the container is visible to the outside. This may allow checking the cooking situation without opening the door. It is possible to expect an improvement in cooking performance and an improvement in ease of use.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking apparatus, comprising:
   a housing having an open top surface and having a cooking space formed therein, the housing being configured to receive a container inserted into the housing, the container having an open top surface to receive food to be cooked therein;
   a door provided on a top of the housing to open and close the cooking space; and
   a heating unit provided in the housing and configured to contact a bottom surface of the container to heat the container, wherein the heating unit includes:
      a heating unit body defining a support surface that supports the container and a heater provided in the heating unit body;
      a heater mounting portion that protrudes downward from the heating unit body and extends along a peripheral shape of the heating unit body, and configured to receive the heater; and
      a plurality of heat-transfer ribs that extends radially from a center of the heating unit to an outer edge of the heating unit and passing through the heater mounting portion, wherein a height of each of the plurality of heat transfer ribs gradually increases as the plurality of heat transfer ribs extends from the center of the heating unit to the outer edge thereof.

2. The apparatus of claim 1, further including:
   at least one rib that extends downward from the heating unit body to prevent water or foreign material from entering between the heating unit and a bottom of the housing; and
   a recess formed in a bottom surface of the housing at a position corresponding to the at least one rib, wherein the at least one rib is received in the recess.

3. The apparatus of claim 2, wherein the at least one rib includes:
   an outer rib; and
   an inner rib spaced apart from the outer rib and disposed inwardly from the outer rib and extending along the peripheral shape of the heating unit body.

4. The apparatus of claim 3, wherein the recess is in contact with a lower end of the inner rib.

5. The apparatus of claim 3, wherein the plurality of heat-transfer ribs connects the outer rib and inner rib.

6. The apparatus of claim 2, wherein the plurality of heat-transfer ribs connects the at least one rib and the heater mounting portion.

7. The apparatus of claim 3, wherein the outer rib is shorter than the inner rib, and wherein a lower end of the outer rib is spaced apart from the bottom surface of the housing.

8. The apparatus of claim 3, wherein the heater mounting portion is formed in an inner region of the inner rib and has a lower height than the inner rib.

9. The apparatus of claim 3, wherein each of the plurality of heat-transfer ribs extends from the center of the heating unit through the heater mounting portion, the inner rib to the outer rib.

10. The apparatus of claim 2, wherein a connection portion is protrudes downward from the bottom surface of the heating unit at a location more inwardly than the at least one rib, and a terminal of the heater passes through the connection portion, wherein a through hole is formed in the bottom surface of the housing such that the connection portion and the terminal of the heater are exposed to an outside of the housing through the through hole.

11. The apparatus of claim 2, wherein the bottom surface of the heating unit has an engagement boss that protrudes downward, wherein a fastener that passes through the housing from an outside of the housing is fastened to the engagement boss, and wherein the engagement boss is positioned more inwards with respect to the center of the housing than the at least one rib.

12. The apparatus of claim 2, wherein the at least one rib is formed along a periphery of the heating unit, and wherein the at least one rib is positioned more outwards with respect to the center of the housing than a plurality of openings formed in the housing.

13. The apparatus of claim 1, wherein the heating unit body is made of a metal material, and the heating unit body and the heater are insert-injected.

14. The apparatus of claim 13, wherein the heater mounting portion is partially cut-away to form a cut-out through which the heater is exposed to an outside.

15. The apparatus of claim 1, wherein the heater mounting portion has a larger cross-sectional area than that of the heater such that the heater is received within the heater mounting portion.

16. The apparatus of claim 1, wherein a center hole is formed at a center of the heating unit body in which a temperature sensing device is disposed.

17. The apparatus of claim 1, wherein a gasket is formed on a bottom surface of the door to contact an upper end of the container to allow air-tightness between the container and the door, and wherein an inner portion of the door defined by the gasket is transparent so that an interior of the container is visible to an outside.

18. The apparatus of claim 1, further including:
a center hole that passes through the heating unit; and
a temperature sensing device housed inside of the center hole and configured to contact the container to sense a temperature thereof, wherein the temperature sensing device includes:
a base plate that blocks a base hole passing through the housing;
a temperature sensor configured to contact the container to sense the temperature thereof; and
an elastic member that is provided on the base plate and supports the temperature sensor thereon to maintain the temperature sensor in contact with the container.

19. The apparatus of claim 18, wherein the plurality of heat-transfer ribs extends from the center hole.

20. The apparatus of claim 18, wherein the plurality of heat-transfer ribs is inclined from the center hole to the heater mounting portion.

* * * * *